United States Patent
Cashmore et al.

(10) Patent No.: US 11,273,953 B2
(45) Date of Patent: Mar. 15, 2022

(54) SHIPPING PALLET AND/OR DECK USEFUL FOR SUCH

(71) Applicant: RDP GROUP LIMITED, Auckland (NZ)

(72) Inventors: David Matchett Alfred Cashmore, Big Omaha (NZ); Bruce Coubray, Auckland (NZ)

(73) Assignee: RDP GROUP LIMITED, Auckland (NZ)

( * ) Notice: Subject to any disclaimer, the term of this patent is extended or adjusted under 35 U.S.C. 154(b) by 0 days.

(21) Appl. No.: 16/963,872

(22) PCT Filed: Jan. 23, 2019

(86) PCT No.: PCT/IB2019/050579
§ 371 (c)(1),
(2) Date: Jul. 22, 2020

(87) PCT Pub. No.: WO2019/145881
PCT Pub. Date: Aug. 1, 2019

(65) Prior Publication Data
US 2021/0047073 A1    Feb. 18, 2021

(30) Foreign Application Priority Data

Jan. 23, 2018   (NZ) .......................................... 739359

(51) Int. Cl.
*B65D 19/00*   (2006.01)
*B65D 19/40*   (2006.01)

(52) U.S. Cl.
CPC ..... *B65D 19/0018* (2013.01); *B65D 19/0012* (2013.01); *B65D 19/0065* (2013.01);
(Continued)

(58) Field of Classification Search
CPC ................ B65D 2519/0094; B65D 2519/0096
(Continued)

(56) References Cited

U.S. PATENT DOCUMENTS 3,120,825 A * 2/1964 Johnson ............... B65D 19/004
108/53.3
3,167,341 A * 1/1965 Higgins ............. B65D 19/0048
294/67.4
(Continued)

FOREIGN PATENT DOCUMENTS

CA       2982035 A1 *  4/2018  ......... B65D 19/0008
CN     105460344 A      4/2016
(Continued)

OTHER PUBLICATIONS

International Search Report and Written Opinion of International Searching Authority for International Application No. PCT/IB2019/050579.

*Primary Examiner* — Jose V Chen
(74) *Attorney, Agent, or Firm* — JCIP; Joseph G. Chu; Jeremy I. Maynard

(57) ABSTRACT

A single deck pallet comprising a deck having a top for supporting a load and a bottom, at least four sides, the at least four sides comprising a first pair of opposed sides and a second pair of opposed sides. A plurality of intermediate spaced apart beams of the deck extending between at least a first pair of opposed sides. A plurality of distributed primary props dependent from the deck and projecting below the bottom of the deck to aid in supporting the pallet on a surface. Preferably the primary props are horizontally spaced apart from each other and from said at least one beam so as to allow a tine of a forklift to pass in a linear direction parallel to the at least one beam between adjacent primary (Continued)

props to reach at least partially under and bear on the bottom of the deck and bear on the beam.

9 Claims, 13 Drawing Sheets

(52) U.S. Cl.
CPC .... B65D 19/40 (2013.01); *B65D 2519/00034* (2013.01); *B65D 2519/00069* (2013.01); *B65D 2519/0094* (2013.01); *B65D 2519/00129* (2013.01); *B65D 2519/00288* (2013.01); *B65D 2519/00318* (2013.01); *B65D 2519/00338* (2013.01); *B65D 2519/00412* (2013.01)

(58) Field of Classification Search
USPC .......................... 108/53.3, 53.1, 53.5, 57.32
See application file for complete search history.

(56) References Cited

U.S. PATENT DOCUMENTS

| | | | | |
|---|---|---|---|---|
| 3,424,110 | A * | 1/1969 | Toot | B65D 19/004 108/53.3 |
| 3,664,272 | A | 5/1972 | Sanders | |
| 3,701,326 | A * | 10/1972 | Herman | B65D 19/0097 108/53.3 |
| 3,762,344 | A | 10/1973 | Chez | |
| 3,981,249 | A * | 9/1976 | Herrmann | B65D 19/0095 108/52.1 |
| 5,596,933 | A | 1/1997 | Knight et al. | |
| 5,606,921 | A * | 3/1997 | Elder | B65D 19/004 108/53.3 |
| 5,664,934 | A * | 9/1997 | Schaede | B65D 71/0096 414/799 |
| 5,979,338 | A * | 11/1999 | Salmanson | A47B 57/22 108/107 |
| 7,690,215 | B2 | 4/2010 | Bender et al. | |
| 9,340,322 | B2 * | 5/2016 | Harris | A47B 47/028 |
| 2004/0112260 | A1 * | 6/2004 | Grainger | B64D 9/003 108/53.1 |
| 2007/0163473 | A1 | 7/2007 | Shuert | |
| 2011/0265695 | A1 * | 11/2011 | Moore | B65D 19/0095 108/53.3 |
| 2012/0037050 | A1 * | 2/2012 | Nevo | B65D 19/0038 108/53.3 |
| 2012/0048154 | A1 * | 3/2012 | Toomer | B65D 19/0018 108/53.3 |
| 2013/0213277 | A1 * | 8/2013 | Linares | B65D 19/06 108/57.21 |
| 2015/0040803 | A1 * | 2/2015 | Burk | B65D 19/0038 108/53.3 |
| 2016/0221714 | A1 * | 8/2016 | Liao | B65D 19/0097 |
| 2018/0251259 | A1 * | 9/2018 | Shuert | B65D 19/0018 |
| 2019/0092523 | A1 * | 3/2019 | Wu | B65D 19/004 |
| 2019/0185205 | A1 * | 6/2019 | Jurcak | B65D 19/38 |

FOREIGN PATENT DOCUMENTS

| | | | | |
|---|---|---|---|---|
| GB | 1481805 | A | 8/1977 | |
| GB | 2080760 | A | 2/1982 | |
| GB | 2103573 | A * | 2/1983 | ............ B65D 19/40 |
| TW | M502647 | U | 6/2015 | |
| WO | WO-2008054325 | A1 * | 5/2008 | ............ B65D 19/18 |
| WO | WO-2013086560 | A1 * | 6/2013 | ............ B65D 19/38 |
| WO | WO-2019145881 | A1 * | 8/2019 | ............ B65D 19/40 |

* cited by examiner

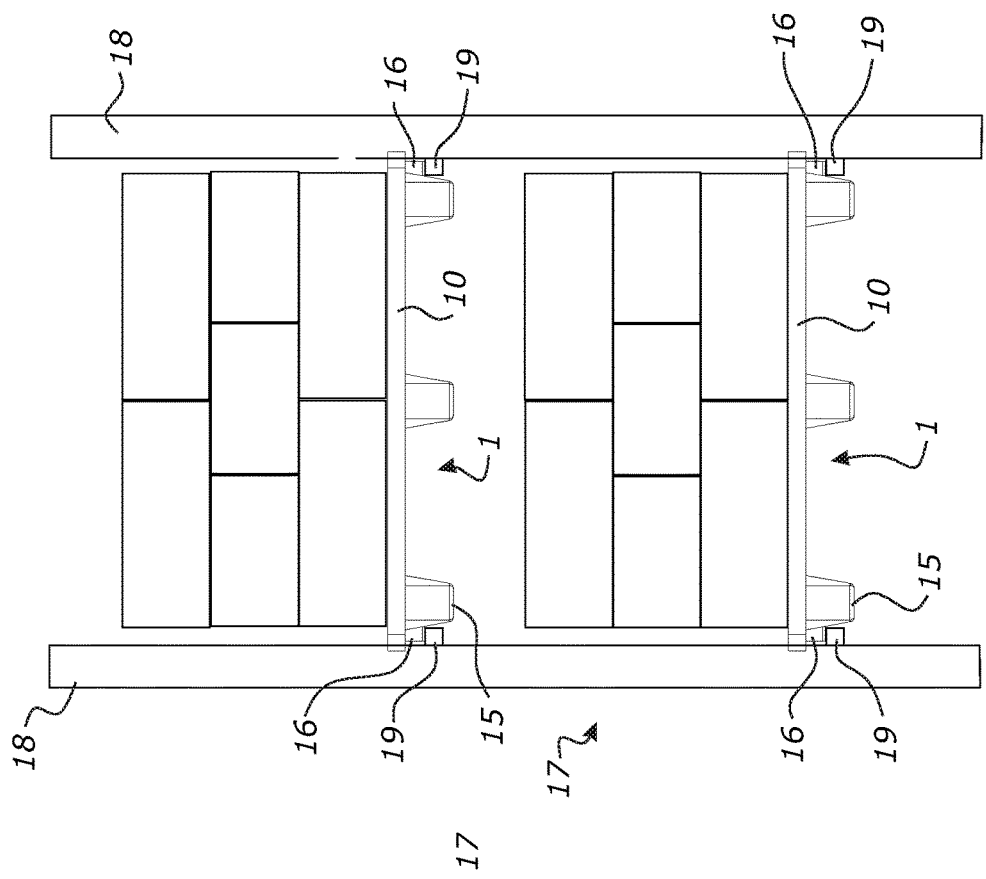
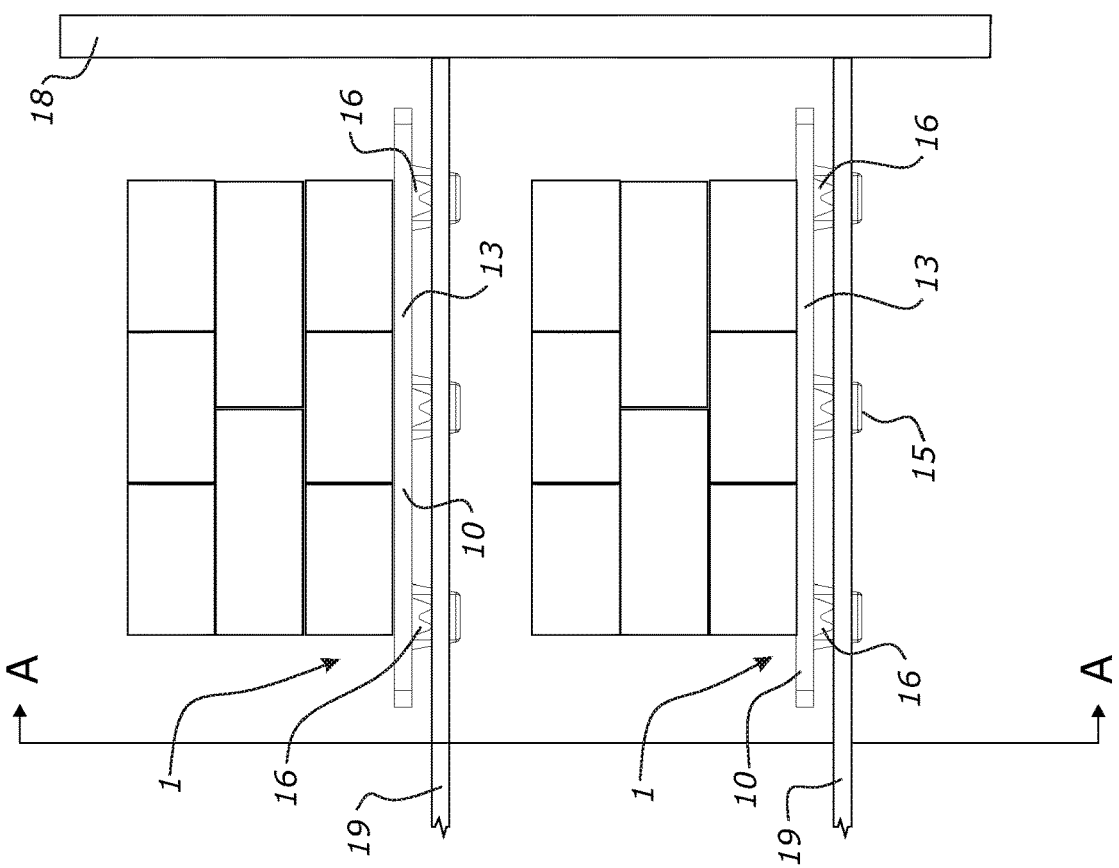
*Figure 9b*
*Figure 9a*

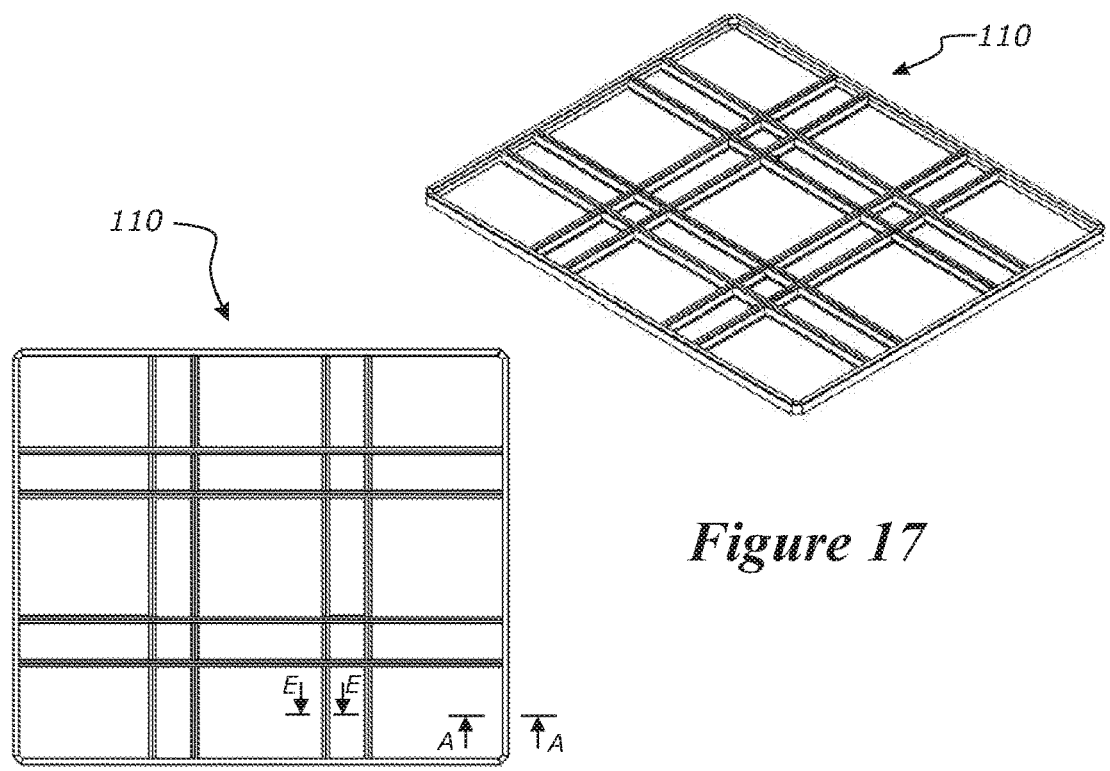
*Figure 17*
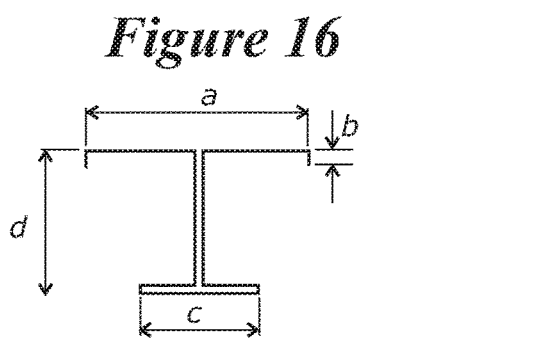
*Figure 16*
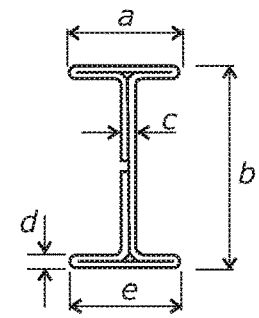
*Figure 18*
*Figure 19*
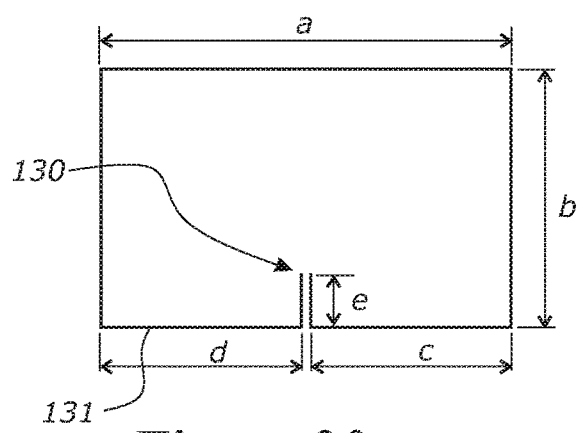
*Figure 20*
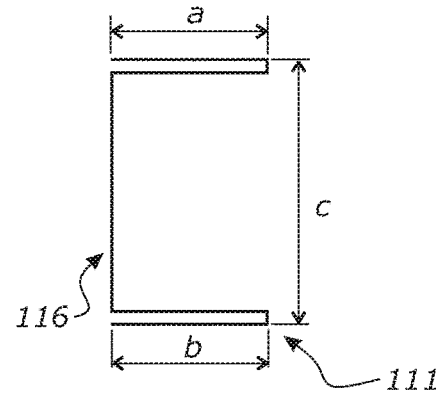
*Figure 21*

US 11,273,953 B2

SHIPPING PALLET AND/OR DECK USEFUL FOR SUCH

FIELD OF THE INVENTION

The present invention relates to a shipping pallet and/or a deck useful for such.

BACKGROUND TO THE INVENTION

Shipping pallets for storing and transporting goods are primarily of a twin deck construction made from timber panels and beams. The top and bottom of the pallets are usually defined by wooden panels arranged in a parallel manner and that in concert act to provide the pallet as a laminate structure. This provides the pallet with high load bearing strength in bending and torsion. Being made from wood, such pallets are relatively cheap. They are usually designed to be able to receive the tines of a forklift to be lifted by the forklift when carrying a load.

However wooden shipping pallets have several dis-advantages.

One disadvantage occurs in cross-border shipping of goods carried on such pallets. Being made from wood, regulations in some countries require the wood to be fumigated before being allowed to leave the seaport or airport of arrival and enter the country. This can be expensive and time consuming. If left untreated microbes may grow on/in the wooden pallets and this can be unhygienic.

Another disadvantage is that wooden pallets can absorb water and become heavy and weaker as a result. Wooden pallets are also very susceptible to impact damage. Leaderboard damage from fork lifts driving too fast into the pallets is a common cause of failure.

Another disadvantage is that their transport, for return to origin for example, can be cost prohibitive and as such, the wooden pallets are often discarded after one use. The twin deck format of such a pallet does not lend itself to economic transport to origin due to the volume of space it consumes. Pallets able to nest in a stacked configuration solve this problem. U.S. Pat. Nos. 7,690,215 and 3,664,272 are examples. Nestable pallets such as this are typically single deck pallets. Twin decks usually prevent with nesting. But not having a twin deck "laminate" structure compromises the strength of such single deck pallets. Steel beams such as shown in U.S. Pat. No. 5,596,933 can be introduced to increase load bearing strength of a single deck pallet. If higher strength is desired, more/thicker steel beams can be added. Or the beams can be of a higher second moment of inertia to resist out of plane bending, this being best achieved by increasing the height of the beams. More/thicker steel beams increases the weight of the pallet which is undesirable because this adds to manufacturing and transport costs. Increasing the height of the beams reduces the compactness of stacked nested pallets which can increase storage and/or return shipping costs.

Pallets may be stored in storage racks that do not have a deck but instead two parallel pallet support rails. Typically the pallets are supported on the two parallel rails of the storage rack, at two opposed edges of the pallets. Storage racks may come in two formats, the first being a drive thought format where pallets are loaded sequentially on two rails from one end of the rails and a second being standard racking where the pallets are loaded onto the rails lateral to the rail direction by being lowered onto the rails. The load on top of the pallet causes bending of the pallet between two rails. The pallet hence needs to be strong in bending to resist collapse under load. A single deck pallet whilst better suited for nested stacking with like pallets may be weaker in bending than a twin deck pallet of similar weight and size. In addition standard rack loading and unloading of single deck pallets can be problematic. Tines of a forklift need a gap between the rails and the deck of the pallet.

It is therefore an object of the present invention to provide a shipping pallet that addresses at least some of the above mentioned disadvantages and/or which will provide users with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

For the purposes of this specification, the term "plastic" shall be construed to mean a general term for a wide range of synthetic or semisynthetic polymerization products, and generally consisting of a hydrocarbon-based polymer. PLA is also envisaged.

For the purpose of this specification, where method steps are described in sequence, the sequence does not necessarily mean that the steps are to be chronologically ordered in that sequence, unless there is no other logical manner of interpreting the sequence.

SUMMARY OF THE INVENTION

In one aspect the present invention may be said to be a deck of or for a pallet or crate able to carry a load and be lifted by tines of a fork lift the deck comprising a square or rectangular spaced perimeter, at each of the four edges of the deck there is provided a respective metal perimeter beam.

Preferably the perimeter beam(s) is of a constant cross section.

Preferably the height of the perimeter beam(s) defines substantially the thickness of the deck.

Preferably the perimeter beam(s) is made from sheet metal.

Preferably all said perimeter beams is/are roll formed from sheet metal.

Preferably the sheet metal is no thicker than 1.8 mm thick.

Preferably the sheet metal is no thicker than 1 mm thick.

Preferably the sheet metal is about 1 mm thick.

Preferably the beam(s) has at its outer perimeter region that is adjacent the perimeter of the deck, one of (a) an engineered profile or (b) two plies of said sheet metal, in order to increase the second moment of inertia of the beam at that region.

Preferably the beam(s) is quadrilateral in cross section and one face of the cross sectional shape is presented vertically at the outer perimeter of the deck and two faces extend from each end of said one face in a horizontal direction into the deck, the two faces each comprising two plies of said sheet metal.

Preferably the perimeter beam(s) 111 have a top wall 115 and a bottom wall 117, and a sidewall 116 being at the base 119 of U-shaped cross section, wherein at least one of the top and bottom wall defined by two plies of the sheet metal.

Preferably the top and/or bottom wall is of two plies of sheet metal extending from the outer wall of the perimeter beam.

Preferably the outer wall of the perimeter beam is of a single ply of said sheet metal.

Preferable extending between the perimeter beams is a grid of metal intermediate beams.

Preferably the intermediate beams extend in the same plane as each other and preferably in the same plane as the perimeter beams.

Preferably the perimeter beams are square or rectangular in cross section.

Preferably the perimeter beams are I-beams.

Preferably the perimeter beams are U-shaped in cross section the trough of the U-shape presented as the outer perimeter region of the perimeter beam.

Preferably the intermediate beams are square or rectangular in cross section.

Preferably the intermediate beams are I-beams.

Preferably the intermediate beams are U-shaped in cross section the trough of the U-shape presented vertically.

Preferably at least one intermediate beam extends between (and preferably to) two opposed perimeter beams, intermediate (and preferably parallel) the other two intermediate beams.

Preferably at least two intermediate beams extends between (and preferably to) two opposed perimeter beams, intermediate (and preferably parallel) the other two intermediate beams.

Preferably at least four intermediate beam extends between (and preferably to) two opposed perimeter beams, intermediate (and preferably parallel) the other two intermediate beams.

Preferably at least one intermediate beam extends between (and preferably to) the other two opposed perimeter beams, intermediate (and preferably parallel) the two intermediate beams.

Preferably at least two intermediate beams extends between (and preferably to) the other opposed perimeter beams, intermediate (and preferably parallel) the two intermediate beams.

Preferably at least four intermediate beam extends between (and preferably to) the other opposed perimeter beams, intermediate (and preferably parallel) the two intermediate beams.

Preferably the intermediate beam(s) is of a constant cross section.

Preferably the height of the intermediate beam(s) defines substantially the thickness of the deck.

Preferably the intermediate beam(s) is made from sheet metal.

Preferably a said intermediate beam and preferably all said perimeter intermediate beams is/are roll formed from sheet metal.

Preferable the sheet metal is no thicker than 1.8 mm thick.

Preferably the sheet metal is preferably no thicker than 1 mm thick.

Preferably the sheet metal is about 1 mm thick.

In a second aspect the present invention may be said to be a deck of or for a pallet or crate able to carry a load and be lifted by tines of a fork lift the deck comprising a square or rectangular spaced perimeter wherein a grid of intermediate beams is provided of at least two first set of beams extending between a first pair of opposed sides of the deck and at two second set of beams extending between a second pair of opposed sides of the deck, the beams formed from sheet metal that defines the cross sectional perimeter of the beams, at least one of the first and second set of beams defining the bottom of the deck at where fork lift times are able to engage to lift the deck the beams wherein the profile of the bottom of at least one of said first and second set of beams is provided selected from at least one of (a) an engineered profile (b) a double wall of said sheet metal.

Preferably (a) an engineered profile and/or (b) a double wall of said sheet metal is provided in a manner to increase bend resistance of the profile at the bottom of said beam.

Preferably (a) an engineered profile and/or (b) a double wall of said sheet metal is provided in a manner to increase second moment of interia of the profile at the bottom of said beam.

Preferably the first set of beams are of the same cross sectional profile.

Preferably the second set of beams are of the same cross sectional profile.

Preferably the first set of beams are of the same cross sectional profile as the second set of beams.

Preferably the beam(s) is of a constant cross section.

Preferably the height of the beam(s) defines substantially the thickness of the deck.

Preferably said beams are roll formed from sheet metal.

Preferable the sheet metal is no thicker than 1.8 mm thick.

Preferably the sheet metal is preferably no thicker than 1 mm thick.

Preferably the sheet metal is about 1 mm thick.

Preferably the first set of beams are at least 700 m long.
Preferably the first set of beams are at least 800 m long.
Preferably the first set of beams are at least 900 m long.
Preferably the first set of beams are at least 1000 m long.
Preferably the first set of beams are at least 1100 m long.
Preferably the first set of beams are at least 1200 m long.
Preferably the second set of beams are at least 700 m long.
Preferably the second set of beams are at least 800 m long.
Preferably the second set of beams are at least 900 m long.
Preferably the second set of beams are at least 1000 m long.
Preferably the second set of beams are at least 1100 m long.
Preferably the second set of beams are at least 1200 m long.
Preferably the first set of beams are no longer than 800 m long.
Preferably the first set of beams are no longer than 900 m long.
Preferably the first set of beams are no longer than 1000 m long.
Preferably the first set of beams are no longer than 1100 m long.
Preferably the first set of beams are no longer than 1200 m long.
Preferably the second set of beams are no longer than 800 m long.
Preferably the second set of beams are no longer than 900 m long.
Preferably the second set of beams are no longer than 1000 m long.
Preferably the second set of beams are no longer than 1100 m long.
Preferably the second set of beams are no longer than 1200 m long.

Preferably the beams of at least one of the first and second set of beams are quadrilateral in cross section and the engineered profile is a flange of said sheet metal extending into the interior or the beam.

Preferably beams comprise of both a single ply of said sheet material wall construction and double ply of said sheet material wall construction.

Preferably beams comprise of both a single ply of said sheet material wall construction and double ply of said sheet material wall construction at said lower region of the beam.

Preferable first and second pair of opposed sides of the deck have located thereat perimeter beams.

Preferably the perimeter beams are as herein described.

Preferably the first and/or second set of beams are I-beams.

Preferably the I-beams have a bottom flange comprising of a double ply of said sheet metal.

Preferably at least one intermediate beam extends between (and preferably to) two opposed perimeter beams, intermediate (and preferably parallel) the other two intermediate beams.

Preferably at least two intermediate beams extends between (and preferably to) two opposed perimeter beams, intermediate (and preferably parallel) the other two intermediate beams.

Preferably at least four intermediate beam extends between (and preferably to) two opposed perimeter beams, intermediate (and preferably parallel) the other two intermediate beams.

Preferably at least one intermediate beam extends between (and preferably to) the other two opposed perimeter beams, intermediate (and preferably parallel) the two intermediate beams.

Preferably at least two intermediate beams extends between (and preferably to) the other opposed perimeter beams, intermediate (and preferably parallel) the two intermediate beams.

Preferably at least four intermediate beam extends between (and preferably to) the other opposed perimeter beams, intermediate (and preferably parallel) the two intermediate beams.

Preferably the intermediate beam(s) is of a constant cross section.

Preferably the height of the intermediate beam(s) defines substantially the thickness of the deck.

Preferably the intermediate beam(s) is made from sheet metal.

Preferably a said intermediate beam and preferably all said perimeter intermediate beams is/are roll formed from sheet metal.

Preferable the sheet metal is no thicker than 1.8 mm thick.

Preferably the sheet metal is preferably no thicker than 1 mm thick.

Preferably the sheet metal is about 1 mm thick.

Preferably a plurality of props extend downwardly from the deck, the props arranged to ensure that the pallet can be stably supported on ground or a deck or on a like pallet.

Preferably the props are internally formed as part of a top panel for the deck.

Preferably the props are dependent from the top panel.

Preferably the pallet is able to be edge supported on parallel rails of a storage rack.

Preferably the pallet is a single deck pallet.

Preferably the pallet is able to nest with an identical pallet in a stacked condition.

Preferably the 4 perimeter beams join to each other at 4 respective corners.

Preferably the 4 respective corners are chamfered corners.

Preferably the chamfer is provided by a beam section of the same cross section as the perimeter beams.

Preferably a shock absorber is provided at each corner.

Preferably the shock absorbers are provided rubber blocks.

Preferably the deck that is 1000×1200 mm pallet the deck may weigh around 17 kgs.

Preferably the pallet is no more than 30 kg and preferably less than 25 kg and preferably less than 23 kg.

Preferably the perimeter beams are no more than 0.78 kgs/m length.

The intermediate beams are preferably no more than 0.93 kgs/m (as I-beam as herein described).

Preferably a plurality of props extend downwardly from the deck, the props arranged to ensure that the pallet can be stably supported on ground or a deck or on a like pallet.

Preferably the props are integrally formed as part of a top panel of the deck.

Preferably the props are dependent from the top panel.

Preferably the pallet is able to be edge supported on parallel rails of a storage rack.

Preferably the pallet is a single deck pallet.

Preferably the pallet is able to nest with an identical pallet in a stacked condition.

Preferably the 4 perimeter beams join to each other at 4 respective corners.

Preferably the 4 respective corners are chamfered corners.

Preferably the chamfer is provided by a beam section of the same cross section as the perimeter beams.

Preferably a shock absorber is provided at each corner.

Preferably the shock absorbers are provided rubber blocks.

Preferably the deck is used as part of the single deck nestable pallets as herein described.

In a further aspect the present invention may be said to be a single deck pallet comprising a deck having a top for supporting a load and a bottom, at least four sides, the at least four sides comprising a first pair of opposed sides and a second pair of opposed sides, there being provided a plurality of intermediate spaced apart beams of the deck extending between (and preferably to) at least a first pair of opposed sides, a plurality of discretely distributed primary props dependent from the deck and projecting below the bottom of the deck to aid in supporting the pallet on a surface, where at least one beam extends between adjacent primary props, wherein the primary props are horizontally spaced apart from each other and from said at least one beam so as to allow a tine of a forklift to pass in a linear direction parallel to the at least one beam between adjacent primary props to reach at least partially under and bear on the bottom of the deck and bear on the at least one beam.

Preferably two beams extend between two adjacent primary props.

Preferably the horizontal spacing between a primary prop and an adjacent beam or between adjacent beams between two primary props is less than 100 mm and preferably less than 90 mm and preferably less than 80 mm and preferably less than 70 mm.

Preferably the deck is of a kind as herein before described.

Preferably the pallet is a nestable single deck pallet as herein described.

In yet a further aspect the present invention may be said to be a single deck pallet capable of being edge supported by spaced apart parallel rails of a storage rack, the single deck pallet comprising a deck having a top for supporting a load and a bottom, and at least four sides, the at least four sides comprising a first pair of opposed sides and a second pair of opposed sides, a plurality of discretely distributed primary props dependent from the deck and projecting below the bottom of the deck to support the pallet on a surface, a plurality of discrete secondary props for supporting the pallet on the rails of a rack, each secondary prop projecting below the bottom of the deck and being provided intermediate of a primary prop and an associated at least one of the four sides of the deck to elevate the bottom of the deck above the racks such as to accommodate the passage of a forklift tine between a rail of the rack and the deck of the pallet, and wherein the both the primary props and secondary props are spaced apart so as to allow two tines of a forklift to pass between both the primary props and secondary props to come to bear on the bottom of the deck.

Preferably the deck is further as herein described.

Preferably the width of the deck between the first pair of opposed sides is greater than the gap between the two spaced apart parallel rails of the storage rack upon which the pallet may be supported on the secondary props.

Preferably the plurality of primary props are spaced inwardly adjacent and along the first pair of opposed sides, so as to allow the primary props to sit intermediate of the rails of a storage rack.

Preferably the primary props provided along each of the first pair of opposed sides are spaced apart between the first pair of opposed sides such that said primary props may sit intermediate of the rails of a storage rack.

Preferably the primary props provided along each of the first pair of opposed sides are spaced apart so as to prevent either of the first pair of opposed sides from falling off the rails of the storage rack due to a lateral movement of the pallet relative to the rails when the pallet is supported on the rails by the secondary props.

Preferably the primary props provided adjacent each of the first pair of opposed sides are spaced between the first pair of opposed sides such that, when the rack is supported on the rails by the secondary props, the primary props adjacent each of the first pair of opposed sides engage with the rails to substantially prevent movement of the pallet lateral of the rails.

Preferably the primary props provided along each of the first pair of opposed sides comprise a lead-in such that each primary prop tapers away from the adjacent one of the first pair of opposed sides as the primary prop projects away from the base of the deck.

Preferably the primary props each comprise a projection from the base of the deck, each projection at least in part tapering inwards from each of the first pair of opposed sides as the primary props extends from the base of the deck.

Preferably the plurality of primary props are spaced adjacent and along the second pair of opposed sides, so as to allow the primary props to sit intermediate of each respective second side and the primary props adjacent each second side.

Preferably the primary props provided along each of the second pair of opposed sides are spaced apart so as to prevent either of the second pair of opposed sides from falling off the rails of the storage rack due to a lateral movement of the pallet relative to the rails when the pallet is edge supported on the rails by portions of the deck proximate to each of the second pair of opposed sides.

Preferably the primary props provided along each of the second pair of opposed sides comprise a lead-in such that the primary prop tapers away from the adjacent one of the second pair of opposed sides as the primary prop projects away from the base of the deck.

Preferably the distance the primary props project away from the bottom of the deck is greater than the distance the secondary props project from the deck.

Preferably the primary props provided adjacent each of the second pair of opposed sides are spaced between the second pair of opposed sides such that, when the rack is edge supported on the rails, the primary props adjacent each of the second pair of sides engage with the rails to substantially prevent movement of the pallet lateral of the rails.

Preferably the primary props provided along each of the second pair of opposed sides comprise a lead-in such that each primary prop tapers away from the adjacent one of the second pair of opposed sides as the primary prop projects away from the base of the deck.

Preferably the primary props adjacent each of the first pair of opposed sides of the deck are inset from their associated side of the deck.

Preferably the plurality of primary props are distributed in a grid format from the deck.

Preferably the pallet comprises at least four primary props, wherein four of the at least four primary props are provided adjacent to and at one end of each of the two opposed sides.

Preferably the deck comprises four corners at the intersection of the first pair of sides and second pair of sides, and four primary props are provided at or towards each of the four corners.

Preferably the deck comprises a quadrilateral shape.

Preferably the deck comprises a rectangular or square shape.

Preferably the deck comprises one or more rounded or chamfered corners.

Preferably the plurality of primary props are inset from each of the first pair of opposed sides.

Preferably the plurality of primary props are spaced inwardly adjacent and along both the first pair of opposed sides and second pair of opposed sides.

Preferably secondary props are provided only intermediate of primary props located adjacent and along the first pair of opposed sides.

Preferably secondary props are not provided intermediate of primary props located adjacent and along the second pair of opposed sides.

Preferably the number of secondary props correspond to the number of primary props provided directly adjacent each of the first pair of opposed sides of the deck.

Preferably the pallet comprises at least four secondary props, wherein four of the at least four secondary props are associated with four primary props provided adjacent to and at an end of each of the first set of opposed sides.

Preferably the width of the secondary props along the direction of the first set of opposed sides is less than the width of the primary props along the direction of the first set of opposed sides.

Preferably at least some of the secondary props are dependent from the deck.

Preferably at least some of the secondary props are dependent on at least some of the primary props.

Preferably the secondary props are dependent from primary props located adjacent each of the first pair of opposed sides.

Preferably the single deck pallet may be supported on the rails of the rack on the plurality of secondary props, such that a forklift may access the pallet in a direction substantially perpendicular to the rails of the rack.

Preferably the single deck pallet may be supported on the second set of opposed sides of the deck, such that a forklift may access the pallet in a direction substantially parallel to the rails of the rack.

Preferably the deck between the primary props and each side of the second pair of opposed sides comprises a ledge, such that a pallet supported on the second side of opposed sides is supported on the ledges of the deck.

Preferably the deck comprises a top panel, and dependent from the top panel are the primary props.

Preferably the primary props are integrally formed with the top panel of the deck.

Preferably the top panel comprises a plurality of primary hollow depressions corresponding to the number of primary props and shaped to nest with the primary props of another single deck pallet as herein described.

Preferably the nesting comprises an at least partial receiving of the primary props of another pallet within the plurality of primary hollow depressions of the top panel.

Preferably the top panel comprises a plurality of secondary hollow depressions corresponding to the number of secondary props and shaped to nest with the secondary props of another single deck pallet as herein described.

Preferably the nesting comprises an at least partial receiving of the secondary props of another pallet within the plurality of secondary hollow depressions of the top panel.

Preferably the primary depressions comprise one or more tertiary props projecting towards the deck of the pallet such that the deck of the pallet and the deck of a nested pallet remain separated so as to allow the tines of a forklift to pass between decks.

In a further aspect the present invention may be said to be A system of a pallet rack and a single deck pallet as hereinbefore described wherein the single deck pallet is either a) supported on the rails of the pallet rack on the plurality of secondary props, the opposed sides of the pallet being substantially parallel with the rails of the rack, or b) supported on the opposed ends of the deck, the opposed ends of the pallet being substantially parallel with the rails of the rack.

Preferably the pallet is of a kind as described above.
Preferably the metal is steel.
Preferably the metal is mild steel.

In still a further aspect the present invention may be said to be a plurality of single deck pallets as herein described, the pallets being provided in a nested condition relative each other.

Preferably the perimeter beam may be trapezoidal in shape.
Preferably the secondary props may be provided along all 4 sides of the deck.
Preferably the spacing of parallel intermediate beams between two adjacent primary props in a first orthogonal direction is different to the spacing of parallel intermediate beams between two adjacent props in the $2^{nd}$ orthogonal direction.
Preferably the spacing between beams and adjacent primary props is the same for beams between all adjacent props in a said orthogonal direction.

As used herein the term "and/or" means "and" or "or", or both.

As used herein "(s)" following a noun means the plural and/or singular forms of the noun.

The term "comprising" as used in this specification [and claims] means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred embodiments of the invention will be described by way of example only and with reference to the drawings, in which:

FIG. 9A shows a pallet carrying goods stored in standard racking on parallel rails of the rack, seen in front view, FIG. 9B is a view in direction AA of FIG. 9A.

FIG. 16 shows the metal framework of the deck of the pallet,

FIG. 17 shows a perspective view of the metal framework of FIG. 16,

FIGS. 18-21 show various cross sections of beams that may be used to define the metal frame of the deck.

DETAILED DESCRIPTION OF PREFERRED EMBODIMENTS

Figure 1:
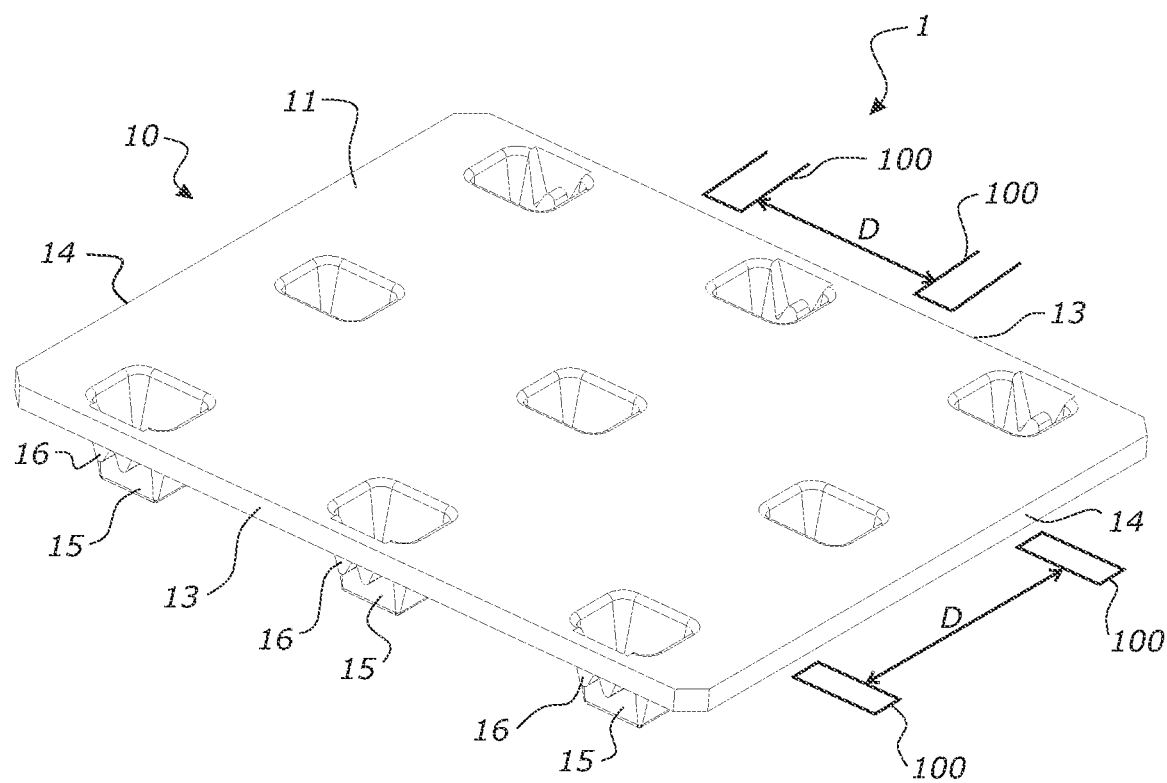
FIG. 1 shows a perspective view of a pallet of a preferred form of the invention shown from above.
Figure 2:
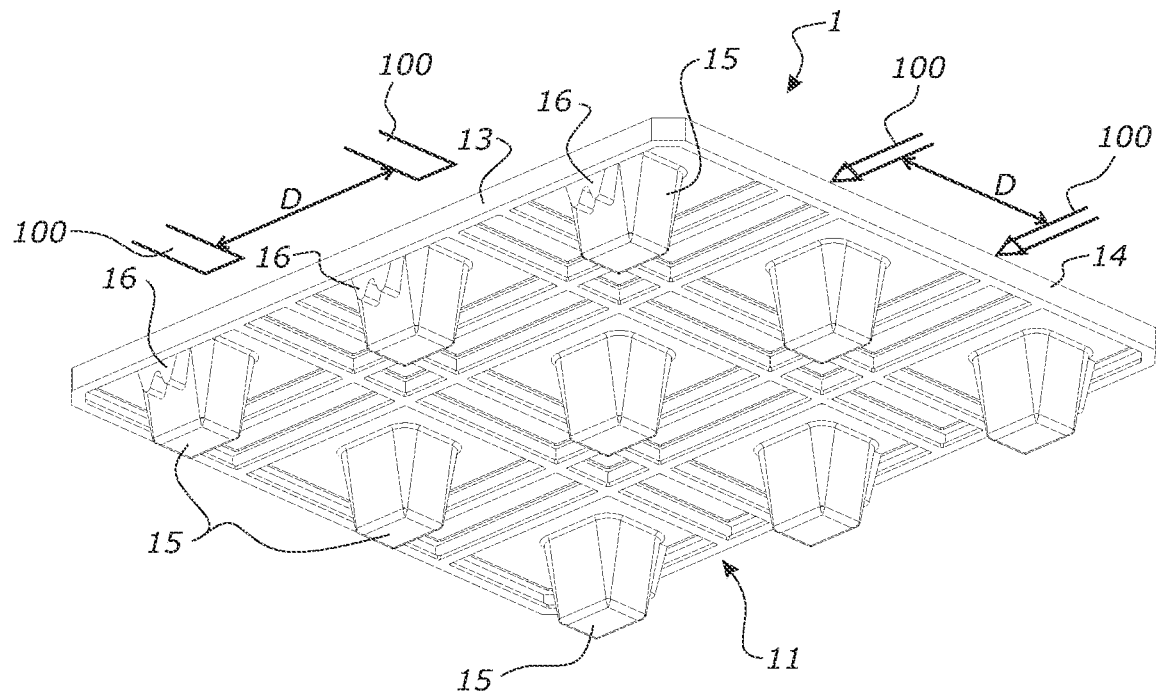
FIG. 2 is a bottom view of the pallet of FIG. 1.

With reference to FIGS. 1 and 2 a single deck pallet 1 is shown. The single deck pallet 1 is capable of being edge supported by spaced apart parallel rails of a storage rack. The single deck pallet 1 may comprise of a deck 10 (defining the plan shape) having a top 11 for supporting a load and a bottom 11. The preferred construction and materials used for the deck is described further below.

The deck 10 of the pallet comprises at least 4 sides, the at least 4 sides including the first pair of sides oppose sides 13 and second pair of opposed sides 14. The pallet can be edge supported along at least one pair of opposed sides of the deck. In most preferred forms the deck will be of a substantially quadrilateral shape such as a rectangle or square shape. Furthermore, the deck may correspond to standardised sizings of pallets commonly used in industry.

In a preferred form the pallet is of a square or rectangular plan shape and it may be of the following dimensions (with preferred total minimum load capacity in edge supporting mode shown) as examples:

600×800 (2000 kg)
1000×1200 (2000 kg)
1000×1000 (2000 kg)

Other deck sized may include:

1000×1200
1006×1206
1016×1219
1067×1067
1200×1200
1020×1200
1060×1200
1100×1100
1165×1165
1166×1242

In a preferred form, for example as shown in FIGS. 1 and 2, the majority of the perimeter of the deck is formed to define a first pair of opposed sides 13 and second pair of opposed sides 14. The first and second pairs of opposed sides intersect with each other at four corners of the deck 10. In some embodiments the deck may comprise of one or more chamfered corners. In addition or alternatively, the corners of the deck may also comprise impact absorbers such as a rubberized covers or attachments for each of the corners.

The pallet may comprise of a plurality of discretely distributed primary props 15. A plurality of discretely distributed primary props 15 are shown in the view of FIG. 2. The plurality of primary props 15 are preferably dependent from the deck 10 and project below the bottom 12 of the deck 10 to support the pallet on a surface such as the ground or a storage rack deck in a manner to support the deck in an elevated manner above the ground/storage rack deck. This ground clearance allows fork lift tines to pass under the deck and then lift the pallet at the deck (by bearing onto the bottom of the deck). All primary props preferably project to an equal distance from the deck.

At least two primary props 15 are preferably located adjacent each edge of the deck so as to provide a stable platform for goods carried on the deck when the pallet is supported on the ground or on another deck. There may hence be at least 4 primary props, one adjacent each corner of the deck. Further props may be provided along each edge and/or intermediate of the edge located props.

Preferably the primary props have openings at their base to allow for liquid to flow through. The deck preferably has air-holes. Preferably the top panel is of one piece and may have an edge lip. It may be covered in an anti-slip coating.

Figure 3:
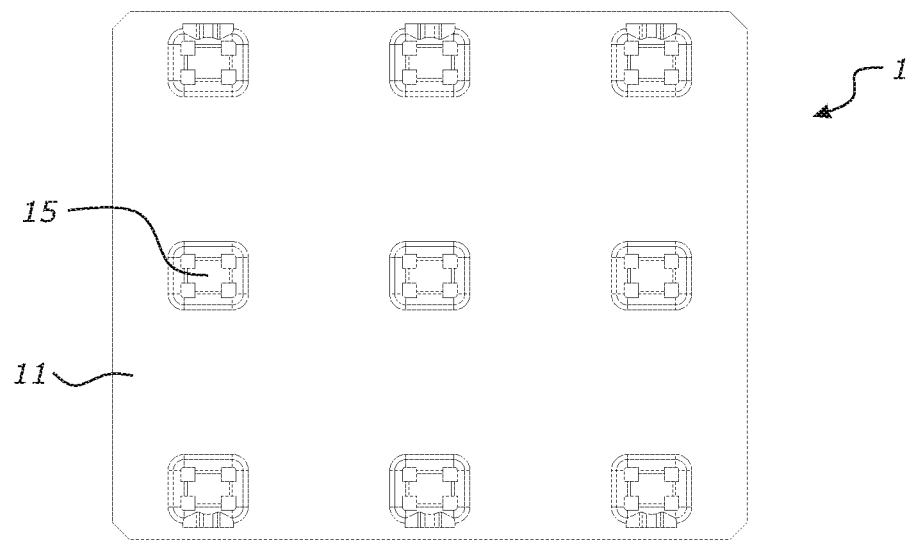
FIG. 3 is a top view of the pallet of FIG. 1.
Figure 4:
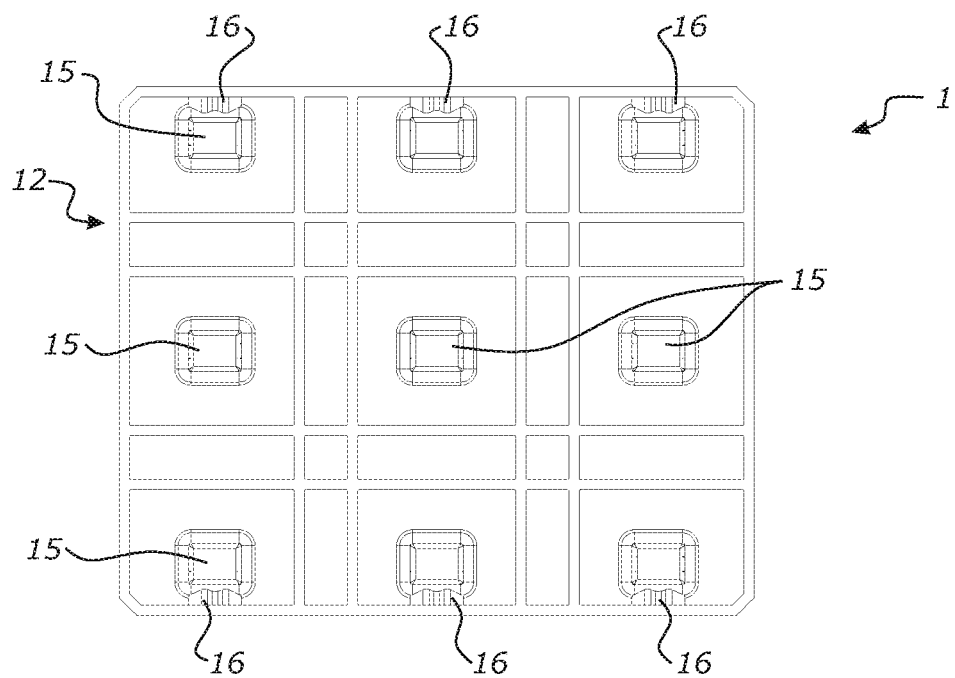
FIG. 4 is a bottom view of the pallet of FIG. 1.

In order to provide spacing such that two tines of a forklift may pass between both the primary props 15 and secondary props 16 and to come to bear on the bottom of the deck, the primary props may be distributed in a grid format from the deck. For example, one such grid format is shown in FIGS. 2 to 4, wherein nine primary props 15 project below the deck and are arranged into aligned rows and columns.

The primary props 15, and particularly the peripheral primary props, being those closest to a side or sides of the deck, may have purposive spatial relationships to either or both of the first pair of sides 13 and second pair of sides 14, as herein after described.

As shown in FIGS. 1 and 2, the pallet 10 may further comprise of a plurality of discrete secondary props 16. These secondary props 16 may, in certain conditions, be used for edge supporting the pallet on the rails of a rack so as to elevate the deck above the rails. Such elevation allows fork lift tines to pass through the gap between the rails and the deck and then lift the pallet by engaging the bottom of the deck. The racking system that may be used for accommodating a pallet in this configuration is sometimes known as standard racking.

Each secondary prop 16 preferably projects below the bottom 12 of the deck 10. They all preferably project to an equal distance from the deck.

In a preferred form secondary props are located near the ends of an adjacent edge to help provide a stable platform for goods carried on the pallet when edge supported on standard rack rails.

In plan view, the secondary props 16 are preferably each provided intermediate of a primary prop 15 and an adjacent one of the 4 sides of the deck 10. For example, as shown in FIGS. 1 and 2, a number of primary props 15 are provided adjacent and along each of the first pair of sides 13. Each of the secondary props 16 are then provided intermediate of each of these primary props 15 and their respective 1 of the first pair of sides 13. In other embodiments the secondary prop 16 may be provided in their intermediate configuration along either or both of the first pair of sides 13 and second pair of sides 14.

Shown in FIGS. 3 and 4 are views from above and below the pallet, showing the top 11 of the deck 10, the bottom 12 of the deck 10, and the primary props 15 and secondary props 16.

In a stored configuration when the secondary props 16 support the pallet 10 on the rails of a rack, the secondary props serve to elevate the bottom 12 of the deck 10 above the racks. This elevation of the bottom of the deck is to be at least such as to accommodate the passage of a forklift tine between a rail of the rack and the deck 10 of the pallet 1.

Figure 5:
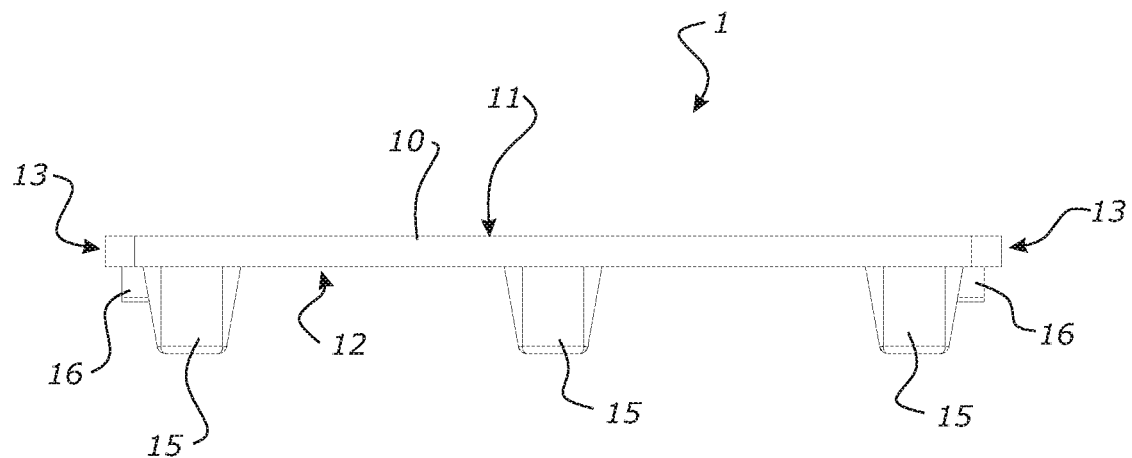
FIG. 5 is a side view of the pallet of FIG. 1.
Figure 6:
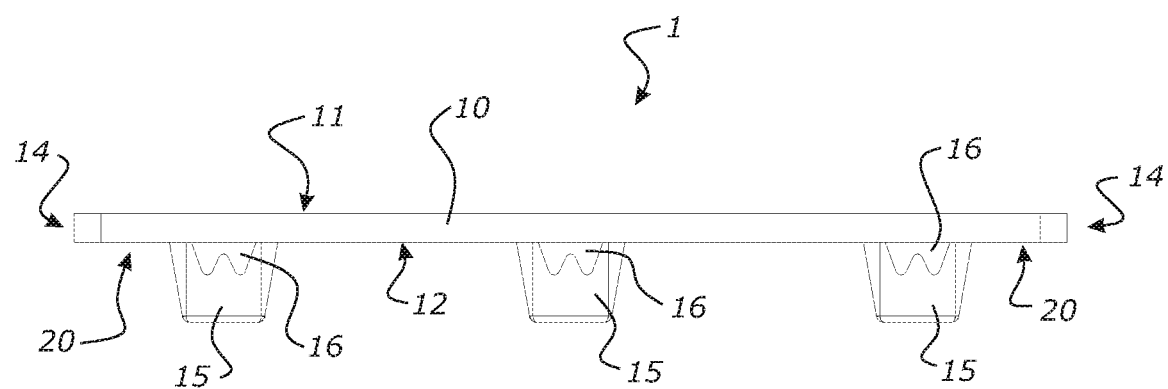
FIG. 6 is an end view of the pallet of FIG. 1.

Shown in FIG. 5 is a side view of the pallet 1. The secondary props 16 are shown in their preferred position intermediate of the outer primary props 15 and the first pair of sides 13. In some forms of pallet (not shown), secondary props 16 are also provided along each of the secondary pair of sides 14. However, in the preferred form, secondary props 16 are not provided along each of the secondary pair of sides 14. Instead, a ledge 20 of the bottom 12 of the deck 10 is provided between the primary props 15 and each of the second sides 14. This is shown for example in FIG. 10b and is so provided to make the pallet suitable for drive-through racking as will herein after be described.

As seen in FIGS. 1 and 2, both the primary props 15 and secondary props 16 are horizontally spaced apart so as to allow two tines 100 of a forklift spaced at distance D apart, to pass between both primary props 15 and secondary props 16 to come to bear on the bottom 12 of the deck 10. This spacing apart of the primary props and secondary props may be a spacing in either the direction of the length of the first pair of sides 13 or second pair of sides 14. In a preferred form however this horizontal spacing of the primary props and secondary props is in both the direction of the first pair of sides 13 and the second pair of sides 14 so that the pallet can be used as a 4 way pallet. In such a configuration, two tines of a forklift may be allowed to pass between both the primary props and the secondary props, and come to bear on the bottom of the deck when the tines of the forklift are introduced in a direction substantially perpendicular to either of the first pair of sides 13, or to either of the second pair of sides 14.

In order to accommodate the secondary props 16, the primary props 15 may be inset from each of the first pair of sides 13. This is particularly in the configuration seen in FIGS. 1 and 2, where the secondary props 16 are positioned intermediate of the primary props 15 and one of the first pair of sides 13, but also directly between each primary prop 15 and its adjacent portion of its associated one of the first pair of sides 13.

In some forms the secondary props 16 may be provided at different positions along the first pair of sides 13, such that they are not directly between a primary prop 15 and an adjacent portion of one of the first pair of sides 13.

In some embodiments the secondary props 16 may extend right up to their respective ones of the first pair of sides 13. Preferably the secondary props 16 are located below and/or very proximal to a respective perimeter beam of the metal frame of the deck (described in detail below) in order to help distribute loading to the metal frame when the pallet is edge supported on a standard storage rack at the secondary props.

Figure 11A:
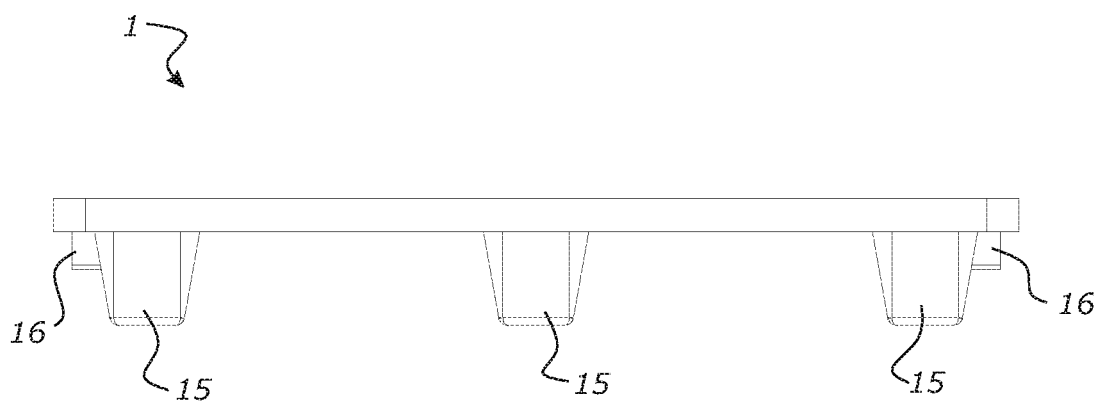
FIG. 11A shows a side view of a variation of a pallet.
Figure 11B:
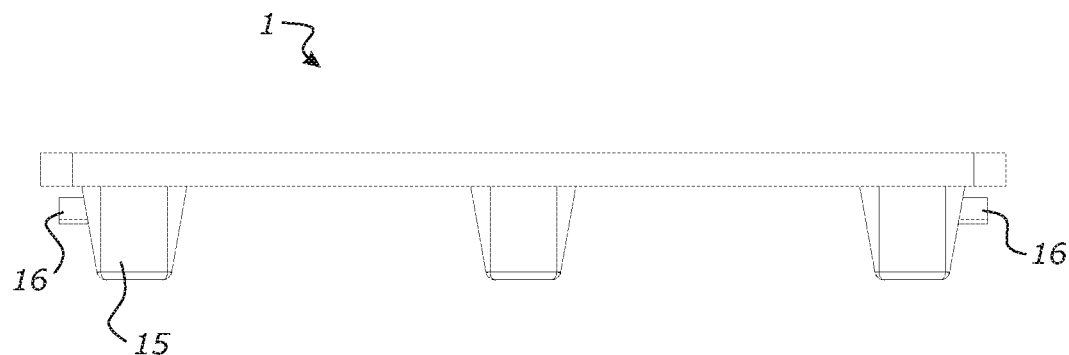
FIG. 11B shows a side view of a further variation of a pallet.
Figure 11C:
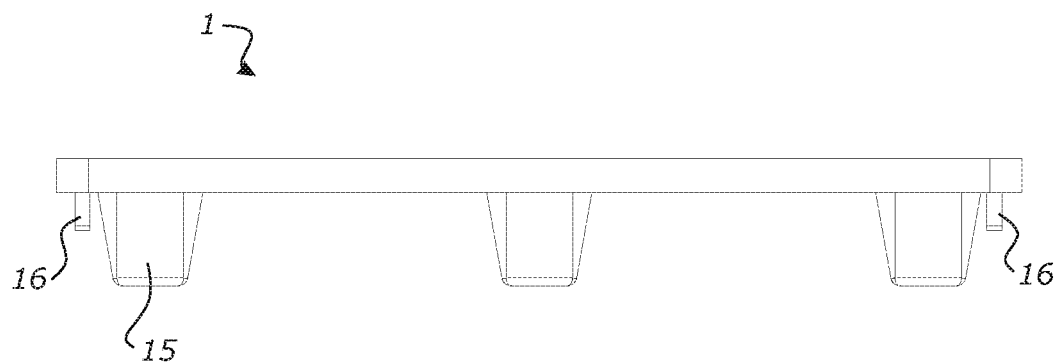
FIG. 11C shows a side view of yet a further variation of a pallet.
Figure 12A:
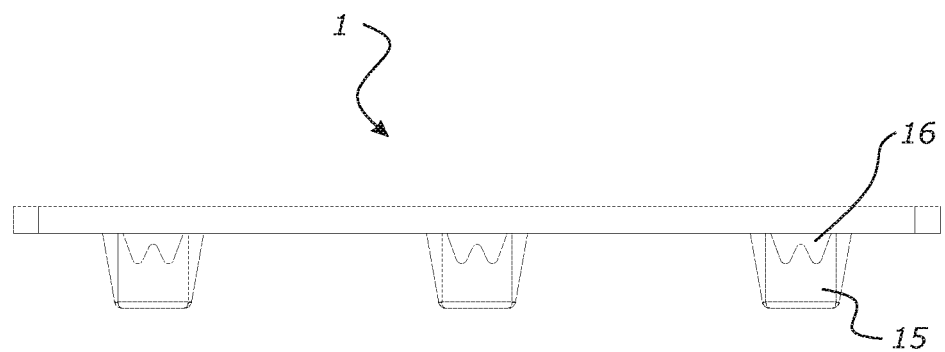
FIG. 12A shows an end view of a variation of a pallet.
Figure 12B:
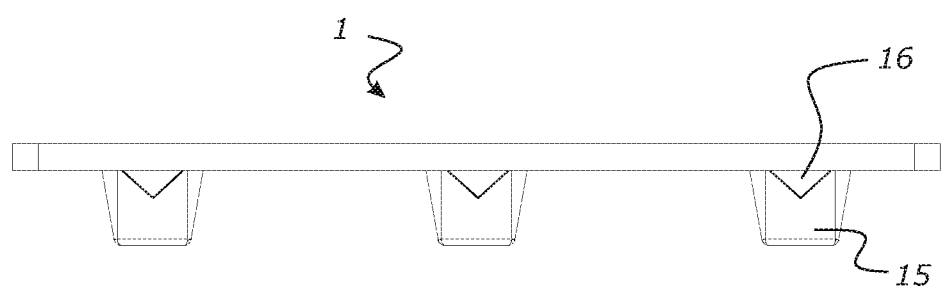
FIG. 12B shows an end view of a variation of a pallet.
Figure 12C:
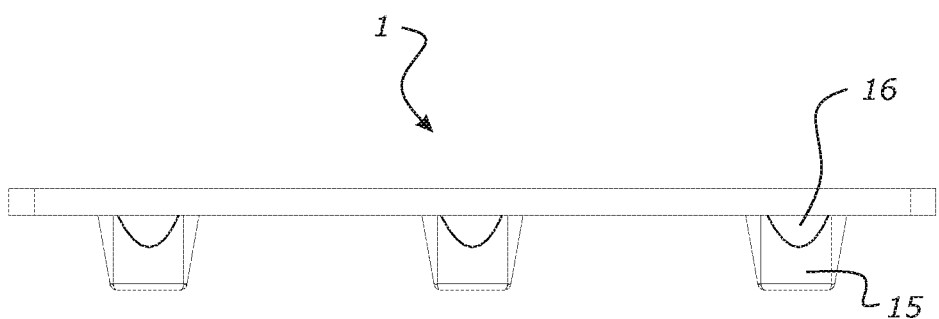
FIG. 12C shows an end view of a further variation of a pallet.

The secondary props 16 may be provided as dependent from either or both of the deck 10 and the primary props 15. Three example configurations of the secondary props 16 are shown in FIGS. 11a to 11c. In FIG. 11a, the secondary props 16 are dependent from, and potentially integrally formed with, both of the deck 10 and primary props 15. In FIG. 11b, the secondary props 16 are provided as dependent only from their associated primary props 15. In FIG. 11c, the peripheral secondary props 15 are also to be provided in a specific relationship in relation to the second pair of sides 14. The secondary props are preferably at least partially nestable but may not be nestable.

Figure 10B:
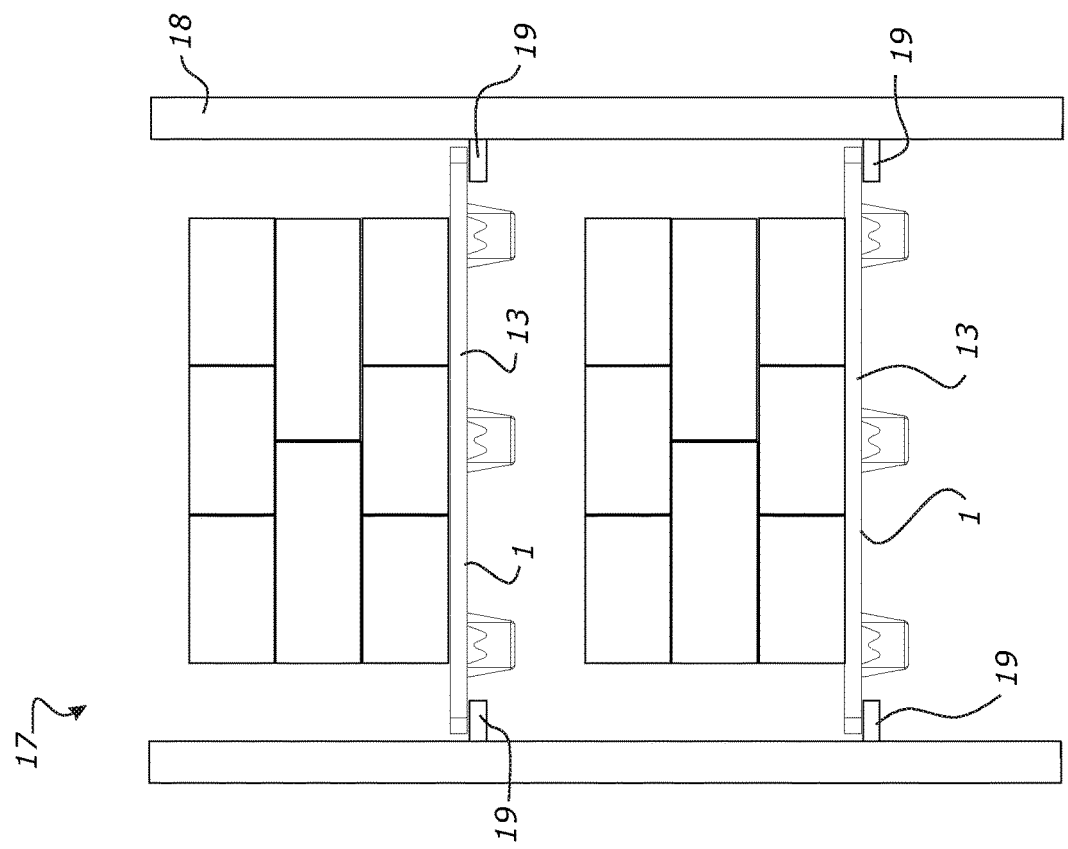
FIG. 10B shows a view in direction BB of FIG. 10A.

The pallet may be edge supported on the rails of a storage rack. A preferred form of providing such edge support is by providing the primary props 15 located along each of the second pair of sides 14 inset from their respective one of the second pair of sides in order to provide a ledge 20. A view of a pallet 1 along the second pair of sides 14 and showing the ledge 20 upon which the pallet may be edge supported is shown in FIG. 10b. If the secondary props 16 are not provided in a corresponding location along the first pair of sides 13 to the primary props 15 then the secondary props 16 at either end of the first pair of sides 13 may also need to be inset from the second pair of sides 14 in order to provide the ledge 20 for this format of rack support.

In the preferred form the ledge 20 adjacent each second pair of sides 14 allows the pallet to be edge supported along the length of the second pair of sides on a pair of rails 19.

In a preferred embodiment the primary props 15 are inset from both of the first pair of sides 13 and second pair of sides 14, and the secondary props 16 are at least in set from the second pair of sides 14.

The pallet 1 is able to be supported on rails of a rack, and the deck 10 of the pallet is accessible at its bottom for lifting by a forklift, when the pallet is oriented either with its first pair of sides 13 or its second pair of sides 14 substantially parallel to the rails of a storage rack.

Views of a potential storage rack 17 with which the pallet 1 may be used are shown in FIGS. 9a to 9b and 10a to 10b. As shown in these figures, the support rack 17 comprises a plurality of uprights 18 and a plurality of associated parallel rails 19. The configurations shown in FIGS. 9 and 10 are by way of example only, and any number of commonly used variations, such as variations in the height, width, and number of rows of rails 19 of the support rack 17 may be provided within the scope of the invention.

A first racking configuration of a pallet 1 is shown in FIGS. 9a and 9b. In this configuration, the first pair of sides 13 are oriented substantially parallel to the rails 19 of the support rack. When oriented relative to the rails 19 in this manner, the pallet 1 is supported on the rails 19 by the secondary props 16.

When supported on the secondary props 16 as shown in FIGS. 9a and 9b, a gap is to be provided between the rails 19 and the deck 10 of the pallet such that the tines of a forklift may be accommodated between the deck and rails.

When supported on the secondary props 16, a pallet 1 may be accessible by a forklift from the side of the rack, that is in a direction perpendicular to the elongate direction of the rails 19.

Accordingly, the depth of projection of the secondary props 16 away from the bottom 12 of the deck 10 may be selected according to the application, such as for forklift tines of different thicknesses, or for different desired clearances for the forklift tines.

Figure 10A:
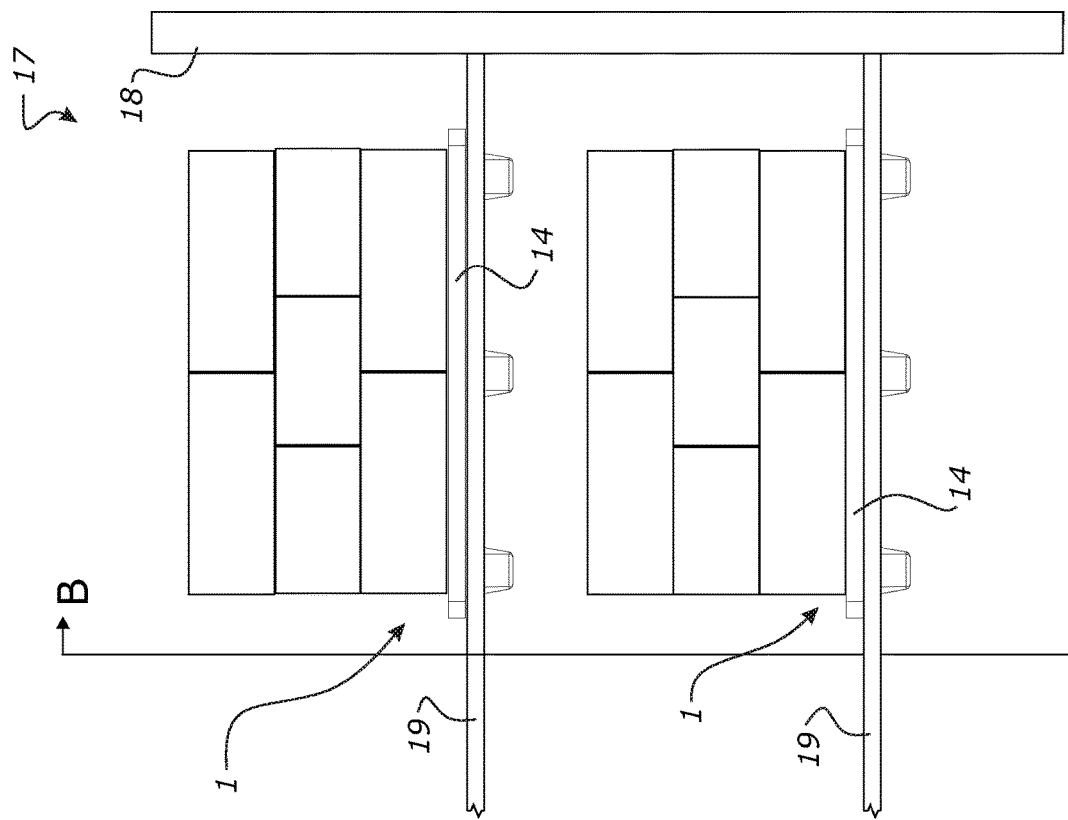
FIG. 10A shows a pallet of a kind as shown in FIG. 1 shown on drive through racking, the pallet carrying goods.

A second racking configuration is shown in FIGS. 10a and 10b. In this configuration, the second pair of sides 14 of the pallet are oriented substantially parallel to the rails 19 of the support rack 17. The pallet is supported on the rails 19 along the ledge 20 of the deck 10 which is located adjacent to each of the second pair of sides 14. Any secondary props 16 provided by the pallet do not need to bear on the rails in this storage configuration. When supported on a rack 17 with the second pair of sides 14 substantially parallel with the rails 19, the pallet is to be accessed by a forklift in a direction parallel to the elongate direction of the rails 19, that is, in a direction along the length of the support rack.

Preferably the width of the deck 10 between either of the pair of sides along which the pallet is to be supported by the rails 19 is greater than the gap between the two spaced apart rails 19 of the storage rack 17. For example, where the pallet is to be supported on the secondary props 16, the width of the deck 10 between the first pair of proposed sides 13 must be of greater width than the gap between the two parallel rails of the support rack 17. Similarly, if the pallet is to be supported on the ledges 20 of the deck 10, such that the second pair of sides 14 are oriented substantially parallel to the rails 19, the width of the deck 10 between the second pair of sides 14 must be greater than the gap between the rails 19.

Preferably in either supported orientation, the plurality of primary props are to be spaced inwardly adjacent and along at least one of the first pair of sides and second pair of sides, but preferably inwardly adjacent and along both pairs of sides. Thus the primary props 15 will sit intermediate of the rails 19 of the storage rack when the pallet is supported by the rails.

Particular spacing of at least the primary props 15 relative to the rails 19 of a support rack 17 may also be desirable.

For the pallet configuration where it is edge supported at the ledges 20 on the rails 19, the spacing of the peripheral primary props 15 along the first pair of sides 13 may be used to control the movement of the pallet lateral of the two rails 19 when the pallet is edge supported on the rails. The primary props 15 are to sit intermediate of the rails 19. By providing the peripheral primary props 15 closer to their adjacent rail 19 than the gap between the rail and the outer edge 14 of the deck, the primary props may act to prevent the pallet from falling off the rails due to restricting the lateral movement of the pallet on the rails.

Similarly, the positioning of the primary props 15 along the second pair of sides 14 may be designed so as to limit the lateral movement of the pallet 1 relative to the rails 19 when the pallet is supported on the secondary props 16.

An example configuration of the distribution of the primary props 15 along the first pair of sides 13 so as to limit the lateral movement of the pallet on the rails 19 when the pallet is edge supported on the ledges 20 of the deck is shown in FIG. 10*b*.

The secondary props may be located along all sides of the pallet. They are preferably located outwardly more of the primary props but may instead, at least in some instances be located inwardly of its adjacent primary prop.

Similarly, an example embodiment showing the distribution of the primary props 15 along the second pair of sides 14 such as to limit the lateral movement of the pallet on the rails 19 when the pallet is supported on its secondary props 16 is shown in FIG. 9*b*.

In some forms the arrangement of the primary props along the first pair of sides and the second pair of sides may be such as to prevent the pallet from slipping off the rails on which it is supported. In other forms, the spacing of the primary props may be act to lock the pallet laterally against the rails 19, in order to limit or even substantially prevent movement of the pallet lateral of the rails.

In order to accommodate the movement limiting relationship between the primary props 15 and rails 19 yet to prevent undesired engagement between the primary props 15 and the rails 19 particularly when loading one into the support rack 17 at least the peripheral portions of the primary props 15 may be provided with a lead in. Such a lead in may be characterized by the primary prop tapering away from the adjacent 1 of the first pair of sides 13 or second pair of sides 14 as the primary prop projects away from the base of the deck. For example, see the embodiment of FIG. 2 wherein the primary props 15 about the periphery of the deck 10 comprise a lead in such that at least their portions adjacent to the first pair of sides 13 and second pair of sides 14 taper away from the sides of the deck as the primary props extend downward.

The distance that the primary props extend below the deck is preferably greater than the distance the secondary props extend below the deck. The secondary prop distance may for example be 30 mm from the bottom of the deck. The primary prop distance may for example be 95 mm.

In a preferred form the top 11 of the deck 10 may be defined by a top panel that comprises a plurality of primary hollow depressions 21. These primary hollow depressions 21 are to correspond to the number of props 15, and to be shaped to nest with the primary props of another single deck pallet. Such primary hollow depressions 21 are seen for example in FIG. 1.

Figure 7:
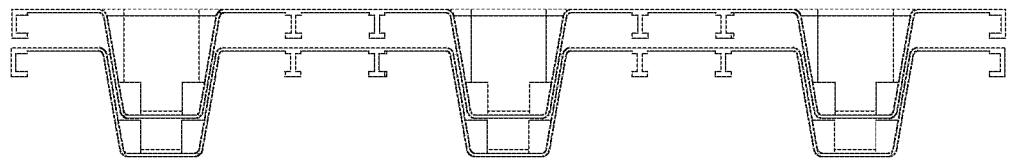
FIG. 7 shows two pallets nested in a stacked configuration in a cross sectional view.

A cross section through two pallets 1 shown in a nested configuration is seen in FIG. 7.

Figure 8:
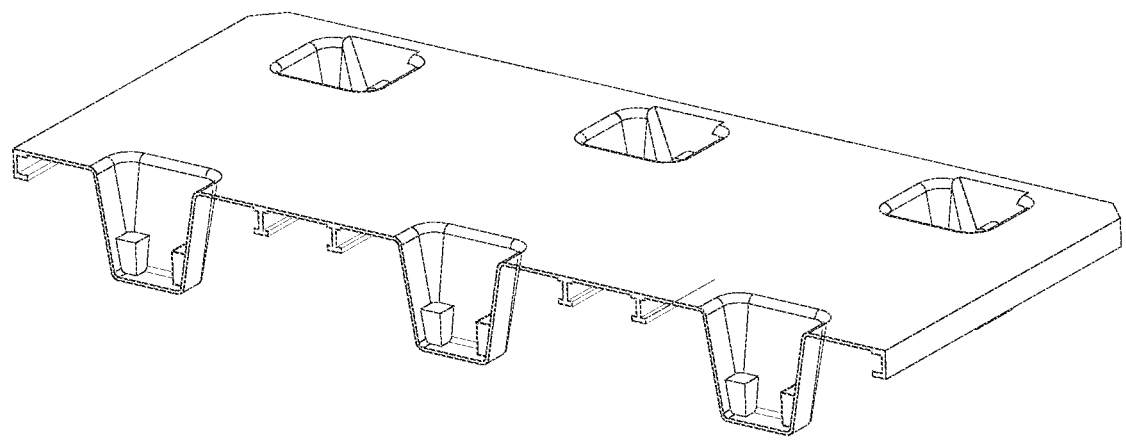
FIG. 8 shows a cross sectional perspective view of the pallet of FIG. 1.

In order to provide for a more complete nesting of single deck pallets of the present invention within each other in a stacked condition, the top panel of the deck of each pallet may further comprise a plurality of secondary hollow depressions 22 corresponding to the number and position of the secondary props 16. The secondary hollow depressions 22 are shaped to nest with the secondary props of another single deck pallet.

Where the single deck pallets are to be nested together, it may be desirable to limit the degree of nesting of the pallets with each other such that the tines of a forklift may still be able to be passed between the decks of the pallets in order to separate them. To this end, either or both the primary hollow depressions 21 or secondary hollow depressions 22, where present, may be provided with at least one tertiary prop 23. The tertiary props 23 according to one embodiment are shown in FIGS. 7 and 8. The tertiary props 23 extend from the base of the depressions upwardly towards the top 11 of the deck 10. The spacing of the decks of nested pallets from each other when in their nested condition may be controlled by varying the height of one or more tertiary props 23.

Preferably the top panel of the deck is of a plastic material. This may be compression formed, vacuum formed, or injection moulded, as examples. The primary props preferably define the primary depressions and the secondary props define the secondary depressions.

Figure 13:
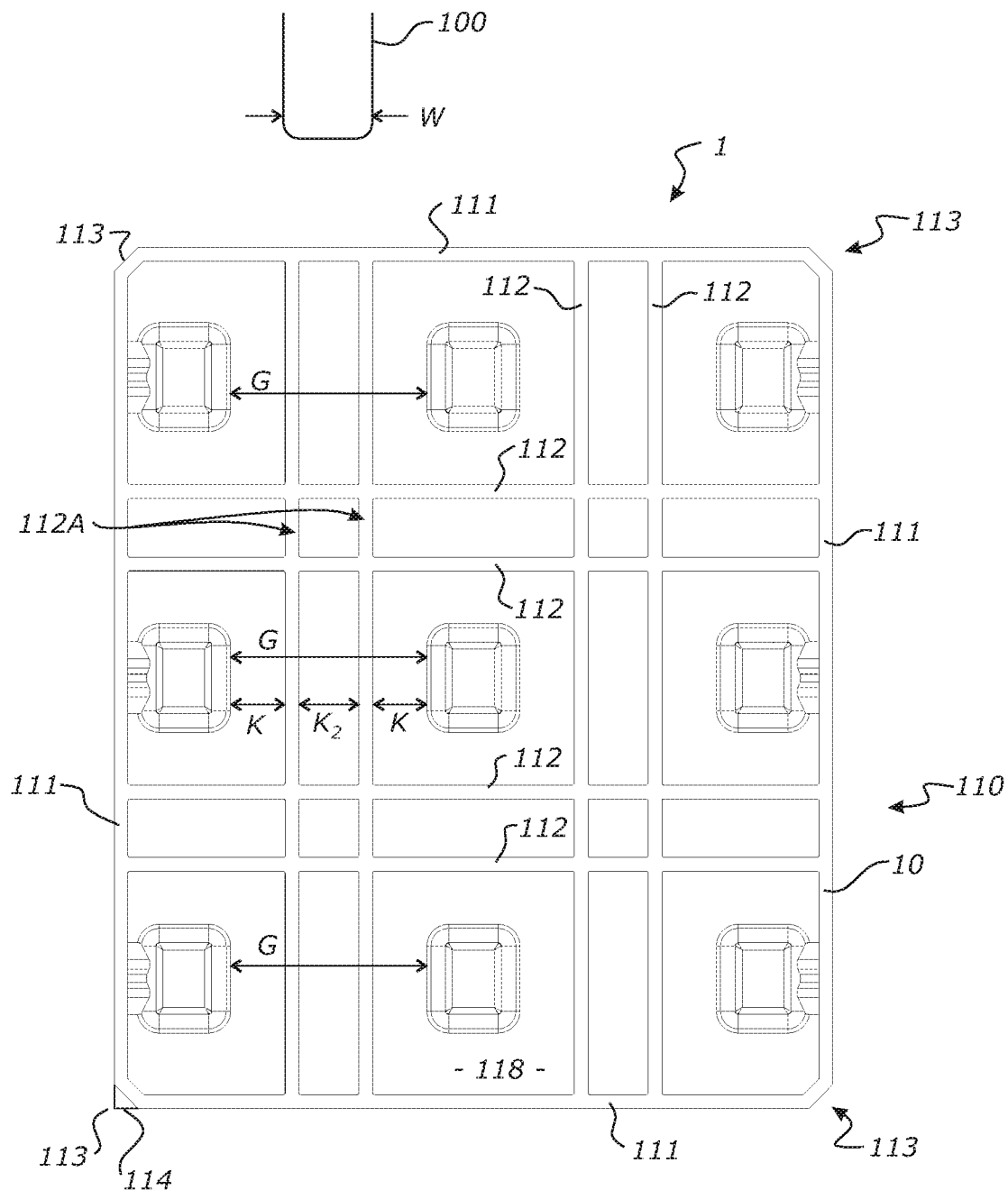
FIG. 13 shows a bottom view of a pallet.
Figure 14:
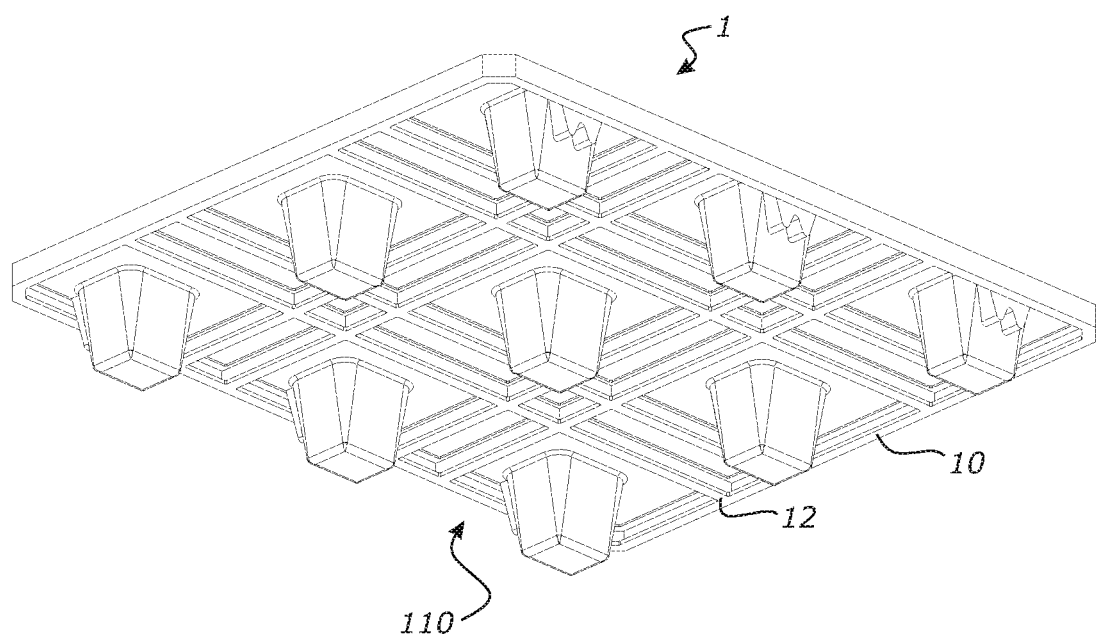
FIG. 14 shows a bottom perspective view of a pallet.

Not relying on a twin deck construction the single deck pallet 1 of the present invention as seen in FIGS. 13 and 14 gains strength from a frame of metal beams 110. The frame of metal beams primarily provides the load bearing capacity of the pallet. When the pallet is for example edge supported along either the first pair of sides or second pair of sides, beams of the frame extending across the gap between the rails, act in bending to carry the load on the pallet. The number of beams and their second moment of inertia in bending in such a manner are hence primary design factors.

In the preferred form the pallet comprises of a deck of perimeter beams about four parallel intermediate beams extending in a first direction and four parallel intermediate beams extending in a second direction being perpendicular to the first direction. Preferably the intermediate beams are either I beam shaped or hollow rectangular section shaped beams.

The grid of metal beams 110 comprises the perimeter beams 111 and intermediate beams 112 as seen in FIG. 13. The perimeter beams meet at corners 113 the corners being either a right-angled corner or a chamfered corner. Chamfered corner as in the preferred form shown in FIG. 13. The corner may also be rounded. The chamfered construction at the corners of the perimeter beams provides additional strength to the corner regions of the pallet. The corner regions 113 may additionally carry shock absorbing elements such as for example shown at the bottom left hand corner in FIG. 13 showing shock absorber 114. The shock absorber may be made of a rubber or plastic material.

In a preferred form the perimeter beams are of a C or U section shape as seen for example in FIG. 21. In the preferred form the region 116 of the C shaped perimeter beam 111 is the outer most portion of the frame 110. The beams could also be box or trapezoidal shaped.

The intermediate beams comprise preferably of beams running between the first pair of sides of the pallet and beams running between the second pair of sides of the pallet. The intermediate beams 112 may be of an I-beam profile as seen in FIGS. 18 and 19 or of a rectangular hollow section as seen in FIG. 20.

The intermediate beams are preferable at right angles and parallel to each other as can be seen in FIG. 13. They assume a grid formation. The intermediate beams at their distal ends are preferably welded to the perimeter beams. They could also be joined in other ways such as mechanical by fasteners or by shape.

Some of the intermediate beams extend continuously between pair of sides whereas beams extending between other pair of sides may be discontinuous and assembled intermediate of the continuous intermediate beams. At the junction between the right angled orientated intermediate beams, the intermediate beams may likewise be welded to each other. In other forms the right angle configured intermediate beams may in part be continuous and may nest together at their junctions and be welded thereat to bond the intermediate beams at their junctions together.

In the preferred form all of the intermediate beams are co-planar. In the preferred form all of the intermediate beams are of the same height so as together, to define the bottom 12 of the deck 10. The bottom 12 of the deck is hence of a planar (though a discontinuous grid of beams) configuration allowing for forklift tines to support the deck at the bottom surface.

The frame 110 is preferably enveloped by a plastic. The plastic preferably defines the top panel 118 that defines the top 11 of the pallet. In the preferred form the plastic also extends about the perimeter of the perimeter beams and also over the bottom of the beams to define the bottom of the pallet. The plastic envelope of the frame may be provided of at least two parts of plastic that are bonded together. The primary part defining the top panel 118 and props and the additional part or parts being plastic received by the frame from below. The top panel may be made from a fibre reinforced plastic. The top panel may be adapted and figured to help keep the beams in column during bending rather than deviating laterally during bending.

Alternatively the plastic may merely define the top panel 118 and the primary and secondary props 15, 16, the frame 110 being secured or otherwise bonded to the plastic.

In some forms the plastic may be compression moulded about the beam grid 110 or injection moulded about the beam grid.

The top panel is where goods or a load is supported on the pallet. The load may be evenly distributed across the beams. However in many situations, a pallet may have an uneven load distribution. In addition a pallet may be picked up by the tines of a forklift in a manner to cause an uneven load distribution and point loading of the tines of a forklift on the bottom of the deck. In addition forklifts may hit the sides of the deck as speed and this may cause damage to the pallet.

Figure 15:
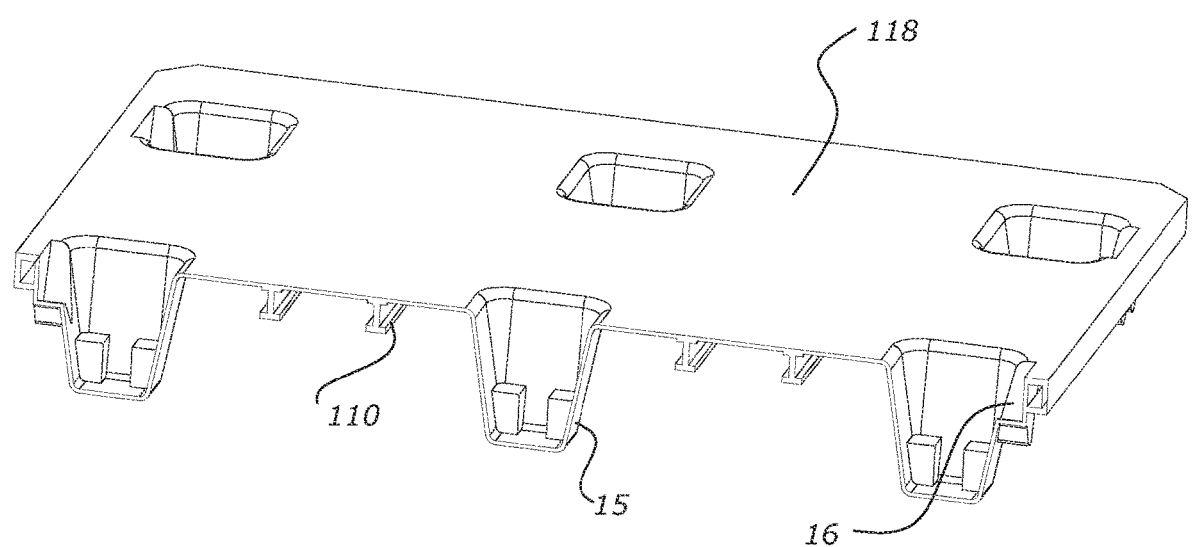
FIG. 15 shows a sectional perspective view of a pallet.
Figure 15A:
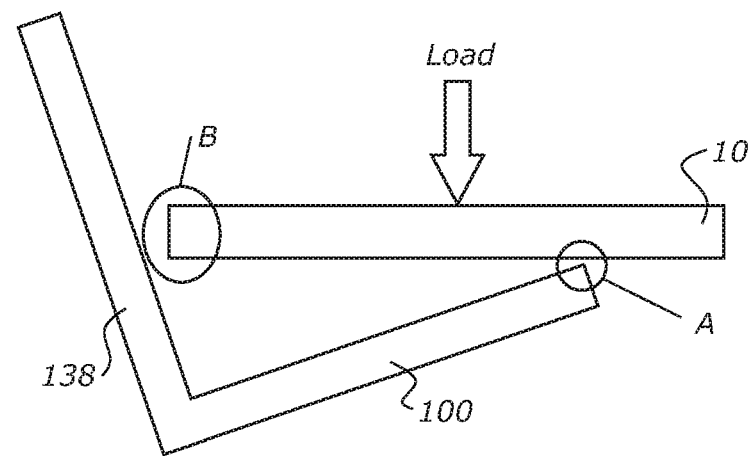
FIG. 15A is a side view of a deck of a pallet and a fork lift tine.

With reference to FIG. 15*a* it can be seen that when a forklift picks up a pallet the tines 100 of a forklift may contact the bottom of the deck 10 (i.e. the bottom of the intermediate beams of the deck) in a manner to create a point load as seen in FIG. 15*a*. This point load on an intermediate beam or beams may result in the creasing or crushing of the wall of the beam at the bottom of the deck. One way to avoid this point loading damaging the bottom of the beam, thereby potentially decreasing the strength of the pallet, is to increase the gauge thickness of the beam. However increasing the gauge thickness increases the weight of the beam or beams and hence then the weight of the pallet. Given that the most likely location for lifting mode damage to occur by a forklift is to the intermediate beams at the bottom region of the beams, it has been found that enhancing the strength of the beams at the bottom region is able to be achieved without substantially increasing the weight of the beams.

The intermediate beams are still able to be manufactured from a thin gauge cold rolled steel sheet yet provide enhanced resistance to creasing/bending due to tine point loading where it is needed such as by an engineered wall profile such as region 130 as seen in FIG. 20 at the bottom surface 131. The engineered profile at region 130 is for example an internal flange extending into the hollow section of the rectangular cross sectioned beam as seen in FIG. 20. The engineered profile enhances the second moment of inertia of the bottom 131 of the beam and as a result enhances the resistance of this region of the beam to creasing damage or impact damage resulting from for example point loading of the end of a forklift tine on the bottom of the beam. In other words, the beam in FIG. 20 remains of a thin gauged steel but has a form at the bottom region that enhances the strength at the bottom region. This allows for the beam to still remain of a low weight given that such enhanced strength formations are not required in other parts of the beam.

In alternative forms the strength of the bottom of intermediate beams may be enhanced by forming the thin gauged sheet in a way so as to double the layers of the sheet at the bottom surface as seen in FIGS. 18 and 19. As can be seen, the distance D in FIG. 19 is double the thickness of the gauge of the sheet metal formed into the I beam format as shown in FIG. 19. Likewise in FIG. 18 at the bottom of the beam a doubling of the sheet metal has occurred to thereby enhance the strength of the beam at this region to help resist impact or crease damage resulting from for example point loading of the forklift tines acting on the bottom of the beams thereat.

Likewise the perimeter beams may have a doubling of sheet metal at the bottom to also help resist impact damage of the perimeter beams at the bottom, as for example seen in the profile of FIG. 21. Hence forming the sheet metal to define the beams in a matter to enhance localised strength of the beams can be achieved instead of enhancing the thickness of the gauge of sheet metal used to form the entire beam, thereby providing weight savings.

The doubled region of the beam preferably extends along the entire length of the beam. But in an alternative configuration, the doubled region may be provided intermediate of the ends of the beam yet still provide enhanced bend resistance.

Sidewall strength enhancement of the perimeter beams is also desirable. At the sidewall 116 the deck of the pallet may be subject to impact damage. Forklift tines are often driven under a pallet at speed and the upturns 138 of the tines may hit the region B as seen in FIG. 15*a* at speed. This can cause impact damage of the perimeter beam thereat. To help improve the strength of the perimeter beam, rather than by increasing the gauge of steel used for forming the perimeter beam, localised strength enhancement can be provided thereby also keeping the weight of that beam down. In the preferred form as shown in FIG. 21 preferably at one and preferably both of the top and bottom flanges of the C shaped cross section of the perimeter beam, a doubling of the sheet metal is provided. As can be seen at both the top and bottom flanges a return flange is defined that extends back towards and preferably to be in line with the plane of the sidewall 116.

This doubling of the sheet metal thereat helps reduce impact damage of the perimeter beam when it may for example be hit at speed by the forklift tines or the upturns 138 of a forklift tine. The side wall itself remains of a single ply of the sheet material thereby keeping the weight of the beam down compared to had the entire beam been formed of a doubling of the thickness of sheet material.

As discussed above forklift tines are able to reach under the deck at locations between the primary. The horizontal spacing between the primary props is such as to allow for sufficient width-wise clearance between props for a tine of the forklift.

To ensure that forklift tines (typically 100 mm wide) contact the bottom of the pallet at where the intermediate beams are provided (intermediate beams extending in the fork-wise direction) are preferably located between the gaps between the primary props. A gap G can be seen in FIG. 13 for a forklift tine 100 to pass through. The forklift tine 100 will come to bear on the intermediate beam(s) 112A. When the pallet is for example stored on the ground, with the primary props supporting the pallet on the ground, the only gap for forklift tines to pass under the deck is at the gap or gaps between adjacent primary props. Given that forklift tines are typically of a width W of 100 mm wide, the gap G between primary props and the positioning of the intermediate beam or beams in the gap is preferably such that the forklift tine is always going to come into contact with an intermediate or where provided both or multiple intermediate beams extending between a gap G of adjacent primary props.

Desirably, as an example, the distances K are preferably less than 100 mm so that if a forklift tine abuts against a primary prop, at its other side the tine sits under an intermediate beam. Likewise the distance between intermediate beams K2 is also less than 100 mm so that a forklift tine cannot slip between the gap between the parallel intermediate beams as shown in FIG. 13. In a preferred form for example the spacing K and K2 is about 70 mm. Likewise the spacing may be such in the other direction but has not been described in detail but will be appreciated by a person skilled in the art how this would work in order to ensure that a forklift tine reaching under a deck of a pallet will always come to bear on an intermediate beam of the pallet The spacing on the other axis may be different as to the axis as show.

It will be appreciated that in FIG. 13 only one forklift tine is shown however two forklift tines are usually used for lifting a pallet, the other forklift tine entering the gap adjacent to the gap described above. As mentioned above forklift tines can also reach below the deck in a direction lateral to the direction shown in FIG. 13 between gaps of adjacent primary props spaced in the other direction.

The pallet of the present invention may be able to be made of a light weight construction. This helps reduce shipping/return costs. It also allows the pallet to be handled by hand. As an example some weights of pallets that are able to be edge supported and able to support an evenly distributed load of 2500 kg may be as follows:

(a) 1200×800—around 18 kg
(b) 1200×1000—around 22 kg.

The pallets may nest to around 50% or better of their height creating further savings on return shipping costs.

The deck of the pallet, primarily defined by the height of the metal frame plus plastic may be between 30 and 60 mm in height.

The use of a thin gauge metal sheet, preferably cold rolled into the desired beam shape preferably allows for at least one of the intermediate beams and perimeter beams to remain of a light weight construction yet have localised reinforcing (such as by providing an engineered profile and/or a doubling up of the layers of the sheet metal at certain locations) to improve impact/crease resistance. In the preferred form the steel gauge used is preferably between 0.045 to 1.8 mm in thickness. Preferably the sheet gauge is 1 mm in thickness. Examples of dimensions and other characteristics of example profiles that can be used for the perimeter and/or intermediate beams is shown below.

EXAMPLES OF BEAMS

Example 1 (FIG. 18)

Made from a single sheet, or two sheets of half the profile each, of cold rolled steel, formed into an I shape with either continuous or spot welds joining the 2 halves of the sheet where required.

Parameters:

| | Preferred Profile |
|---|---|
| Steel type | Cold rolled |
| | Range of strengths |
| | Coated or not coated |
| | Standard or high tensile |
| Steel gauge | 0.045 mm to 1.80 mm |
| Height of I beam | 10 mm-60 mm |
| Top width | 10 mm-80 mm |
| Length of down turns | 0 mm-60% of height of I-beam |
| Length of up turns | As with down turns (not shown). NOTE: If up turns are present don't necessarily need to have down turns and vice versa. |
| Bottom Width | 4 mm-80 mm |
| Welding | Stitch or continuous weld along top seam, or, spot weld on up portion of I-Beam as close as practicable to the top such that the two halves of the top are held together when under load. |
| Example dimensions | a = 30 mm b = 4 mm c = 15 mm d = 30 mm |

Example 2 (FIG. 19)

Made from a single sheet, or two sheets of half the profile each, of cold rolled steel, formed into an I shape with either continuous or spot welds joining the 2 halves of the sheet where required.

Parameters:

| | Preferred Profile |
|---|---|
| Steel type | Cold rolled |
| | Range of strengths |
| | Coated or not coated |
| | Std or high tensile |
| Steel gauge | 0.045 mm to 1.80 mm |
| Height of I beam | 10 mm-60 mm |
| Top width | 5 mm-80 mm. Double thickness |
| Length of down turns (not shown) | 0 mm-60% of height of I-beam |

-continued

| | Preferred Profile |
|---|---|
| Length of up turns | As with down turns (not shown). NOTE: If up turns are present, do not necessarily need to have down turns and vice versa. |
| Bottom Width | Same as top. Double thickness. |
| Welding | Stitch or continuous or spot weld on up portion of I-Beam as close as practicable to the join, so that the two pieces are held in place when under load. NOTE: Seam could be in many places - top middle, bottom middle, either edge. |
| Example dimensions | a = 16 mm b = 30 mm c = 1 mm d = 2 mm e = 15 mm |

Example 3 (FIG. 20)

Made from a single sheet, or two sheets of half the profile each, of cold rolled steel, formed into a box shape with either continuous or spot welds joining the 2 ends of the sheet where required.
Parameters:

| | Preferred Profile |
|---|---|
| Steel type | Cold rolled<br>Range of strengths<br>Coated or not coated<br>Std or high tensile |
| Steel gauge | 0.045 mm to 1.80 mm |
| Height of box section | 10 mm-60 mm |
| Top width | 5 mm-80 mm |
| Length of down turns | 0 mm-60% of height of I-beam |
| Length of up turns | As with down turns (not shown). NOTE: If up turns are present, do not necessarily need to have down turns and vice versa. |
| Bottom Width | 5 mm-80 mm |
| Welding | Stitch or continuous weld along bottom seam, such that the two halves on the bottom are held together when under load. |
| Example dimensions | a = 38 mm b = 30 mm c = 18 mm d = 18 mm e = 4 |

Example 4 (FIG. 21)

Made from a single sheet of cold rolled steel, formed into a "C" shape.
Parameters:

| | Preferred Profile |
|---|---|
| Steel type | Cold rolled<br>Range of strengths<br>Coated or not coated<br>Std or high tensile |
| Steel gauge | 0.045 mm to 1.80 mm |
| Height of C section | 10 mm-60 mm |
| Top width | 4 mm-80 mm. Double thickness. |
| Length of down turns | 0 mm-60% of height of I-beam (not shown) |
| Length of up turns | As with down turns (not shown). NOTE: If up turns are present, do not necessarily need to have down turns and vice versa. |
| Bottom Width | 4 mm-80 mm. Double thickness. |
| Example dimensions | a = 15 mm b = 15 mm c = 30 mm |

Figure 15B:
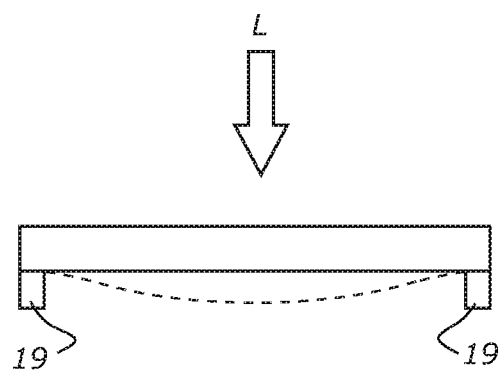
FIG. 15B is a side view of a deck of a pallet end supported on rails showing deflection of the deck when under loading.
Figure 15C:
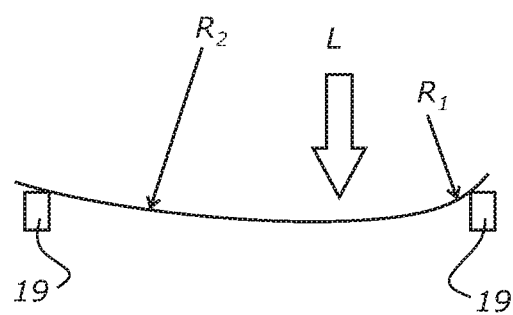
FIG. 15C is a side view of a deck of a pallet showing uneven loading and the resulting uneven curvature of the deck that may result from such loading.

Load distribution has potentially a much more detrimental effect on performance of the pallet than the quantum of the load. As seen in FIG. 15B a pallet having a centrally applied load between each side supports (such as the rails 19 of the rack) will result in a substantially even bend profile of the beams of the deck extending between the rails. However as seen in FIG. 15B an uneven load distribution of a pallet may result in an uneven bend profile and as a result a higher curvature R1 at and/or near one of the rails 19 compared to R2 at or near the other opposite rail. The higher curvature R1 (even though the load L in FIG. 15A may be the same as the load L in FIG. 15B) can result in goods stacked on the pallet from toppling more readily in region R1 given the slope of region of the top of the pallet on which the goods are sitting on. Hence in designing the pallet it is important to take account of uneven load distribution and ensuring that the beams are sufficiently rigid to not either bend to failure or result in a significant slope of the top of the pallet being established which could potentially destabilise the goods on top. The goods may also also crush onto themselves due lean that they may be on.

It will hence be appreciated that the design of the pallet as described above may achieve a good and desirable outcome for carrying loads of up to two tonnes on the pallet and hence having sufficient strength yet able to be nested by virtue of a decrease in the thickness of the deck and/or not by providing a twin deck format. In addition the tension between weight of the pallet and the strength of the pallet is also suitably provided uncompromised. The pallet is sufficiently strong yet is sufficiently light to be handled by hand. In addition the pallet is able to handle a substantial degree of wear and tear and potential damage from for example forklift tines.

Whilst herein described are pallets such as a shipping pallet comprising of a deck and primary props and preferably secondary props it will be appreciated that the deck is also able to be used as part of a shipping crate such a crate comprising of a deck as herein described and sidewalls extending vertically above the deck. The sidewalls may define an enclosure/crate within which goods can be stored. The sidewalls may also assist in load transfer of a plurality of like stacked crates from one pallet to the other at the edges of the deck rather than via props that are located intermediate of the footprint of the crate.

The invention herein described also comprises a system of nesting single deck pallets as herein described in combination with standard racking and preferably also drive through racking. It will be appreciated that the pallets that have herein been described can lend themselves for use in standard and/or drive through racking.

The pallet of the present invention is preferably made of non-bio material. The pallet is preferably made from plastic and metal.

The pallet is preferably a four way pallet allowing fork entry from four sides of the pallet. Preferably the entry ports (the gaps) between adjacent primary props are the same height at all sides based on the fact that the primary props extend an equal distance from the deck.

The perimeter frame is provided to facilitate the storage of the rack in drive through racking. The ledge at the exterior of two parallel sides of the deck, outside of the primary props, allows for drive through racking of the pallet. And again working in conjunction with the props being spaced approximate to the rails of the drive through racking will help hold the pallet on the rails of the drive though racking and prevent the pallet from sliding off the racking.

The props and corners may be replaced if damaged.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A nestable pallet comprising
   a. a square or rectangular shaped perimeter deck able to carry a load and be lifted by tines of a fork lift, the deck comprising
      i. at each of the four perimeter edges of the deck a respective hollow roll formed sheet metal perimeter beam of constant U-shaped cross section that, when viewed in cross section, has (a) a sidewall, being at the base of the U-shape presented at the outer most part of the perimeter of deck and (b) top and bottom walls extending inwardly from the perimeter of the deck from the sidewall, wherein the sidewall of the perimeter beam is of a single ply of said sheet metal and the top and bottom walls are each of two plies of said sheet metal,
      ii. a top panel located on top of and supported by the perimeter beams,
   b. a plurality of props extending downwardly from the top panel and each defining a depression at the top panel, the props arranged to stably supported the pallet on ground and wherein each depression can at least partially receive a prop of an identical deck from above to allow the pallet to nest with such an identical deck in a stacked manner.

2. The pallet as claimed in claim 1 wherein the height of the perimeter beam(s) defines substantially the thickness of the deck.

3. The pallet as claimed in 1 wherein the sheet metal is no thicker than 1 mm thick.

4. A nestable pallet comprising
   a. deck able to carry a load and be lifted by tines of a fork lift the deck comprising
      i. a square or rectangular shaped perimeter wherein a grid of intermediate hollow beams is provided of at least two first sets of intermediate hollow beams extending between a first pair of opposed sides of the deck and of two second sets of intermediate hollow beams extending between a second pair of opposed sides of the deck, the intermediate hollow beams roll-formed from sheet metal that defines a quadrilateral cross sectional wall profile of the intermediate hollow beams, at least one of the first and second set of intermediate hollow beams defining a bottom of the deck at where fork lift times are able to engage the intermediate hollow beams to lift the deck wherein the profile of a bottom of the at least one of said first and second set of intermediate hollow beams to receive the tines comprises of (a) both a single ply of said sheet metal defining part of the quadrilateral shaped wall profile and (b) a double ply of said sheet metal defining a flange extending into an interior of the at least one of said first and second set of intermediate hollow beams to receive the tines,
      ii. a top panel located on top of and supported by the first and second set of intermediate hollow beams,
   b. a plurality of props extending downwardly from the top panel and each defining a depression at the top panel, the props arranged to ensure that the pallet can be stably supported on ground and wherein each depression can at least partially receive a prop of an identical deck from above to allow the pallet to nest in a stacked manner with such an identical deck.

5. The pallet as claimed in claim 4 wherein the height of the intermediate hollow beam(s) defines substantially the thickness of the deck.

6. The pallet as claimed in claim 4 wherein the props are integrally formed as part of a top panel.

7. The pallet as claimed in claim 4 wherein the deck that is 1000×1200 mm pallet the deck weighs around 17 kg.

8. The pallet as claimed in claim 1 the perimeter beams are no more than 0.78 kgs/m length.

9. A single deck nestable pallet comprising:
   a deck having a top panel for supporting a load and a bottom, at least four sides, the at least four sides comprising a first pair of opposed sides and a second pair of opposed sides, there being provided a plurality of intermediate spaced apart intermediate hollow beams of the deck extending between and to at least a first pair of opposed sides,
   a plurality of discretely distributed primary props dependent from the deck and projecting below a bottom of the deck to aid in supporting the pallet on a surface,
   where two of said intermediate hollow beams extend between adjacent primary props,
   wherein the primary props are horizontally spaced apart from each other and from said two intermediate hollow beams so as to allow a tine of a forklift to pass in a linear direction parallel to the two intermediate hollow beams between adjacent primary props to reach at least partially under and bear on the bottom of the deck and to so always bear on at least one of said two intermediate hollow beams,
   wherein each primary prop extends downwardly from the top panel and each defining a depression at the top panel, each depression to at least partially receive a prop of an identical deck from above to allow the pallet to nest in a stacked manner with such an identical deck, and
   wherein, each of the two intermediate hollow beams are roll-formed from sheet metal that defines a quadrilateral cross sectional wall profile of each intermediate hollow beam and wherein the profile of the bottom of each intermediate hollow beams and at where the tines come to bear comprises of (a) both a single ply of said sheet metal defining part of the quadrilateral shaped wall profile and (b) a double ply of said sheet metal defining a flange extending into an interior of each intermediate hollow beam.

* * * * *